US009599721B2

(12) United States Patent
Dai et al.

(10) Patent No.: US 9,599,721 B2
(45) Date of Patent: Mar. 21, 2017

(54) METHOD AND SYSTEM FOR ESTIMATING POSITION WITH BIAS COMPENSATION

(71) Applicant: NavCorn Technology, Inc. c/o Deere & Company, Moline, IL (US)

(72) Inventors: Liwen Dai, Torrance, CA (US); Chaochao Wang, Placentia, CA (US)

(73) Assignee: DEERE & COMPANY, Moline, IL (US)

( * ) Notice: Subject to any disclaimer, the term of this patent is extended or adjusted under 35 U.S.C. 154(b) by 1107 days.

(21) Appl. No.: 13/715,032

(22) Filed: Dec. 14, 2012

(65) Prior Publication Data

US 2013/0120187 A1 May 16, 2013

Related U.S. Application Data

(62) Division of application No. 12/767,912, filed on Apr. 27, 2010.

(51) Int. Cl.
| | | |
|---|---|---|
| G01S 19/44 | (2010.01) | |
| G01S 19/23 | (2010.01) | |
| G01S 19/33 | (2010.01) | |

(52) U.S. Cl.
CPC ............ G01S 19/44 (2013.01); G01S 19/235 (2013.01); G01S 19/33 (2013.01)

(58) Field of Classification Search
USPC ............. 342/357.26, 357.27, 357.72, 357.73
IPC ........................ G01S 19/43,19/44, 19/32, 19/33
See application file for complete search history.

(56) References Cited

U.S. PATENT DOCUMENTS

| | | | | |
|---|---|---|---|---|
| 6,608,998 B1 * | 8/2003 | Neumann | ............... | G01S 19/23 455/12.1 |
| 2007/0120733 A1 * | 5/2007 | Vollath | .................... | G01S 19/44 342/357.27 |
| 2007/0216540 A1 * | 9/2007 | Riley | .................... | G01S 5/0263 340/903 |

(Continued)

OTHER PUBLICATIONS

D.A. Grejner-Brzezinska, Analysis of GPS Data Processing Techniques: in Search of Optimized Strategy of Orbit and Earth Rotation Parameter Recovery, PhD Dissertation, The Ohio State University, 1995.*

(Continued)

*Primary Examiner* — Bernarr Gregory
*Assistant Examiner* — Fred H Mull

(57) ABSTRACT

A primary phase measurement device measures a first carrier phase and a second carrier phase of carrier signals received by the location-determining receiver. A secondary phase measurement device measures the third carrier phase and the fourth carrier phase of other carrier signals. A real time kinematic engine estimates a first integer ambiguity set associated with the measured first carrier phase and a second integer ambiguity set associated with the measured second carrier phase. The real time kinematic engine estimates a third ambiguity set associated with the measured third carrier phase and a fourth ambiguity set associated with the measured fourth carrier phase. A compensator is capable of compensating for the inter-channel bias in at least one of the third ambiguity set and the fourth ambiguity set by modeling a predictive filter in accordance with various inputs or states of the filter estimated by an estimator.

13 Claims, 16 Drawing Sheets

(56) References Cited

U.S. PATENT DOCUMENTS

2010/0164798 A1* 7/2010 Yudanov ............... G01S 19/235
342/357.62

OTHER PUBLICATIONS

J.B. Neumann et al., Glonass Receiver Inter-Frequency Biases—Calibration Methods and Feasibility, ION GPS '99, Nashville, Tennessee, p. 329-337, Sep. 1999.*

* cited by examiner

FIG. 9

S500 — MEASURE A FIRST CARRIER PHASE OF A FIRST CARRIER SIGNAL (E.G., L1 SIGNAL) AND A SECOND CARRIER PHASE OF A SECOND CARRIER SIGNAL (E.G., L2 SIGNAL) RECEIVED BY THE LOCATION-DETERMINING RECEIVER, WHERE THE CARRIERS ARE RECEIVED FROM TWO OR MORE PRIMARY SATELLITES (E.G., GPS SATELLITES).

↓

S502 — MEASURE A THIRD CARRIER PHASE OF A THIRD CARRIER SIGNAL (E.G., G1(K) SIGNAL) AND FOURTH CARRIER PHASE OF FOURTH CARRIER SIGNAL (E.G., G2(K) SIGNAL) RECEIVED BY THE LOCATION-DETERMINING RECEIVER, WHERE THE THIRD AND FOURTH CARRIERS ARE RECEIVED FROM SECONDARY SATELLITES (E.G., GLONASS SATELLITES) AT DIFFERENT FREQUENCIES FROM TWO OR MORE SECONDARY SATELLITES THAT RESULTS IN AN INTER-CHANNEL BIAS BETWEEN CARRIER SIGNALS FROM DIFFERENT ONES OF THE SECONDARY SATELLITES OBSERVABLE AT THE LOCATION-DETERMINING RECEIVER.

↓

S504 — ESTIMATE A FIRST INTEGER AMBIGUITY SET ASSOCIATED WITH THE MEASURED FIRST CARRIER PHASE, AND A SECOND INTEGER AMBIGUITY SET ASSOCIATED WITH THE MEASURED SECOND CARRIER PHASE.

↓

S506 — ESTIMATE A THIRD AMBIGUITY SET (E.G., THIRD INTEGER AMBIGUITY SET) ASSOCIATED WITH THE MEASURED THIRD CARRIER PHASE, AND A FOURTH AMBIGUITY SET (E.G., FOURTH INTEGER AMBIGUITY SET) ASSOCIATED WITH THE MEASURED FOURTH CARRIER PHASE.

↓

S508 — COMPENSATE FOR THE INTER-CHANNEL BIAS IN AT LEAST ONE OF THE THIRD INTEGER AMBUITY SET AND THE FOURTH INTEGER AMBIGUITY SET BY MODELING A PREDICTIVE FILTER (E.G., KALMAN FILTER) IN ACCORDANCE WITH ONE OR MORE OF THE FOLLOWING INPUTS OR STATES OF THE FILTER: POSITION DATA, VELOCITY DATA OF AN OBJECT, ACCELERATION DATA OF THE OBJECT, TROPOSPHERE DATA, IONOSPHERE DATA, A SINGLE DIFFERENCE REFERENCE AMBIGUITY SET ASSOCIATED WITH THE THIRD CARRIER SIGNALS FROM DIFFERENT SECONDARY SATELLITES (E.G., GLONASS REFERENCE SATELLITE G1 SINGLE DIFFERENCE AMBIGUITY), AND A SINGLE DIFFERENCE REFERENCE AMBIGUITY SET ASSOCIATED WITH THE FOURTH CARRIER SIGNALS FROM DIFFERENT SECONDARY SATELLITES (E.G., GLONASS REFERENCE SATELLITE G2 SINGLE DIFFERENCE AMBIGUITY).

↓

S510 — DETERMINE A POSITION OF THE OBJECT BASED ON THE MEASURED FIRST CARRIER PHASE, THE MEASURED SECOND CARRIER PHASE, THE ESTIMATED FIRST INTEGER AMBIGUITY SET, THE ESTIMATED SECOND INTEGER AMBIGUITY SET, AND AT LEAST ONE OF THE MEASURED THIRD CARRIER PHASE AND THE MEASURED FOURTH CARRIER PHASE, AND AT LEAST ONE OF THE COMPENSATED THIRD AMBIGUITY SET (E.G., THIRD INTEGER AMBIGUITY SET) AND THE COMPENSATED FOURTH AMBIGUITY SET (E.G., FOURTH INTEGER AMBIGUITY SET).

↓

S516 — ESTIMATE A PSEUDO-CODE BIAS BETWEEN A SECONDARY PSEUDO-CODE (E.G., GLONASS SP CODE) ENCODED ON THE THIRD CARRIER SIGNAL OR THE FOURTH CARRIER SIGNAL AND THE PRIMARY PSEUDO CODE (E.G., C/A CODE) ENCODED ON THE FIRST CARRIER SIGNAL.

↓

S518 — STORE THE ESTIMATED PSEUDO-CODE BIAS IN A DATA STORAGE DEVICE (E.G., NONVOLATILE RANDOM ACCESS MEMORY) AS PART OF A BIAS TABLE THAT IS ACCESSIBLE AT LEAST TO THE REAL TIME KINEMATIC ENGINE.

METHOD AND SYSTEM FOR ESTIMATING POSITION WITH BIAS COMPENSATION

CROSS REFERENCE TO RELATED-APPLICATIONS

This application is a divisional of U.S. application Ser. No. 12/767,912, filed on Apr. 27, 2010, which claims the benefit of and priority based on U.S. provisional application No. 61/308,467, filed on Feb. 26, 2010, under 35 U.S.C. 119(e).

FIELD OF THE INVENTION

This invention relates to a method and system for estimating position, attitude, or both of an object or vehicle with bias compensation to support combined use of Global Positioning System (GPS) satellite transmissions and GLONASS (Global Navigation Satellite System) satellite transmissions.

BACKGROUND OF THE INVENTION

A location-determining receiver, such as a Global Positioning System (GPS) receiver or a GLONASS (Global Navigation Satellite System) receiver, estimates the position, attitude (e.g., tilt, roll, or yaw), or both of an object or a vehicle. The location-determining receiver may experience imprecise pseudo-range and carrier phase measurements, where the location-determining receiver receives (e.g., transiently) one or more satellite signals of low signal strength or poor signal quality.

GLONASS (Global Navigation Satellite System) and GPS use different satellite constellations and different modulation schemes for their respective satellite transmissions. The GLONASS constellation includes over twenty satellites and broadcasts signals over different frequencies in accordance with a frequency division multiple access (FDMA) modulation and a frequency reuse plan, whereas the GPS system uses spread spectrum modulation or code division multiple access modulation (CDMA) where the transmission frequencies are generally the same for each satellite. Because the GLONASS satellites transmit on different frequencies, which may lead to differences in propagation through the ionosphere or troposphere or other errors, the GLONASS location-determining receiver is susceptible to position error from inter-channel bias associated with the different transmission frequencies of satellites.

Certain location-determining receivers may use an error-reduction filter (e.g., Kalman filter) to filter the results of carrier phase measurements or processed carrier phase measurement data, for example. Some location-determining receivers may use a Receiver Autonomous Integrity Monitoring (RAIM) technique to detect errors of analyzed pseudo-range measurements by comparing the analyzed pseudo-range measurements to reference pseudo-range measurements, where erroneous or outlying pseudo-range measurements can be excluded from a position or attitude solution to improve accuracy of the estimated position or attitude of the object or the vehicle. Neither the error-reduction filter approach, nor the RAIM technique fully addresses the aforementioned problem of imprecise pseudo-range and carrier phase measurements, where the location-determining receiver receives (e.g., transiently) one or more satellite signals of low signal strength or poor signal quality. Thus, there is a need for a location-determining receiver that is capable of using both GPS and GLONASS transmission signals to increase accuracy of position and attitude estimates in real time, while compensating for bias error.

SUMMARY OF THE INVENTION

In accordance with one embodiment, the method and system comprises a primary phase measurement device for measuring a first carrier phase of a first carrier signal (e.g., GPS L1 signal or "L1") and a second carrier phase of a second carrier signal (e.g., GPS L2 signal or "L2") received by the location-determining receiver. The first carrier signal (e.g., L1) is transmitted at substantially the same frequency from two or more primary satellites. The second carrier signal (e.g., L2) is transmitted at substantially the same frequency from two or more primary satellites. A secondary phase measurement device measures the third carrier phase of a third carrier signal (e.g., GLONASS G1(K) signal or "G1(K)") and the fourth carrier phase of fourth carrier signal (e.g., GLONASS G2(K) signal or "G2(K)"). The third carrier signal (e.g., G1(K)) is received at different frequencies from two or more secondary satellites. The fourth carrier signal (e.g., G2(K)) is received at different frequencies from two or more secondary satellites that result in an inter-channel bias between carrier signals from different ones of the secondary satellites observable at the location-determining receiver. A real time kinematic engine estimates a first integer ambiguity set associated with the measured first carrier phase, and a second integer ambiguity set associated with the measured second carrier phase. The real time kinematic engine estimates a third ambiguity set (e.g., third integer ambiguity set) associated with the measured third carrier phase and a fourth ambiguity set (e.g., fourth integer ambiguity set) associated with the measured fourth carrier phase. A compensator is capable of compensating for the inter-channel bias in at least one of the third ambiguity set and the fourth ambiguity set by modeling a predictive filter (e.g., Kalman filter) in accordance with the following inputs or states of the filter: motion data (e.g., position data, velocity data and acceleration data) of the object; troposphere data (e.g., residual troposphere data); ionosphere data; a single difference reference ambiguity set associated with third carrier signals received at the location-determining receiver and a reference station from different secondary satellites (e.g., GLONASS Reference Satellite G1(K) Single Difference Ambiguity or GLN Reference Sat. G1 SD Ambiguity), and a single difference reference ambiguity set associated with fourth carrier signals received at the location-determining receiver and a reference station from different secondary satellites (e.g., GLONASS Reference Satellite G2(K) Single Difference Ambiguity or GLN Reference Sat. G2 SD Ambiguity). An estimator is capable of determining a position of the object based on the measured first carrier phase, the measured second carrier phase, the estimated first integer ambiguity set, the estimated second integer ambiguity set, and at least one of the measured third carrier phase and the measured fourth carrier phase, and at least one of the compensated third ambiguity set (e.g., compensated third integer ambiguity set) and the compensated fourth ambiguity set (e.g., compensated fourth integer ambiguity set).

BRIEF DESCRIPTION OF THE DRAWINGS

FIG. 9 is a flow chart of a fifth example of a method for estimating position with bias compensation.

DESCRIPTION OF THE PREFERRED EMBODIMENT

Figure 1:
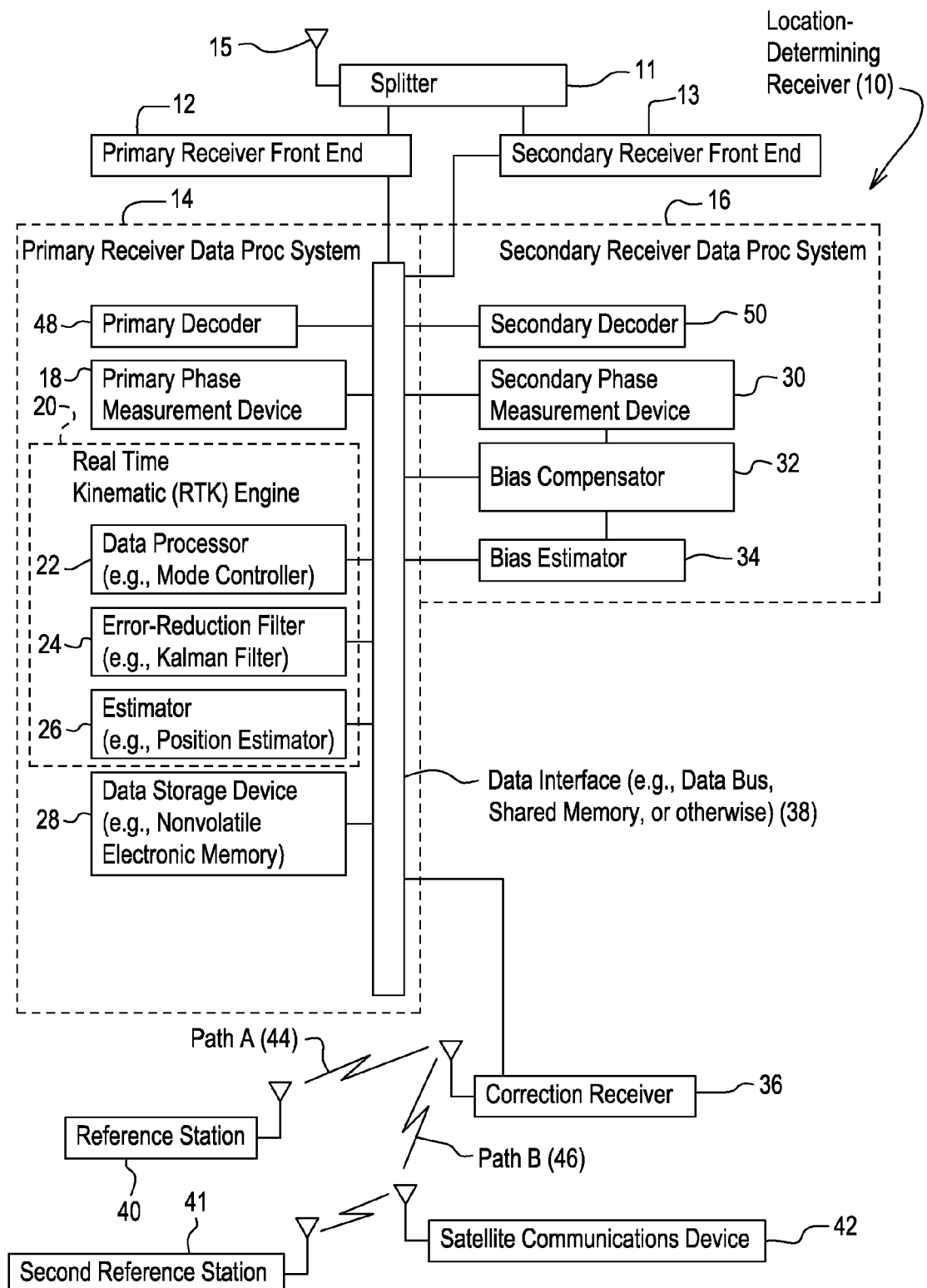
FIG. 1 is a block diagram of a first embodiment of a system for estimating position with bias compensation.

FIG. 1 illustrates a location-determining receiver 10 that comprises a primary receiver front end 12 coupled to a primary receiver data processing system 14 and a secondary receiver front end 13 associated with a secondary receiver data processing system 16. In one embodiment, the primary receiver front end 12 and the secondary receiver front end 13 may be coupled to an antenna 15 by a splitter 11 (e.g., hybrid or filter) or another device. The location-determining receiver 10 is associated with a correction receiver 36. The correction receiver 36 may be integrated into the location-determining receiver 10 or may communicate with the location-determining receiver 10 via a data port. The correction receiver 36 receives correction data (e.g., reference carrier phase correction data) from at least one of a reference station 40 and a second reference station 41.

The reference station 40 communicates via a wireless or electromagnetic signal to the correction receiver 36 via communications path A (44), for example. The second reference station 41 communicates via wireless or electromagnetic signals to the correction receiver 36 via a satellite communications device 42 via communications path B (46), for example. The satellites communications device 42 may comprise a communications satellite equipped with an uplink receiver and a downlink transmitter for communication with one or more ground stations (e.g., mobile or fixed).

Although the correction receiver 36 is illustrated as a single receiver in FIG. 1, in practice the correction receiver may comprise a dual receiver for GPS and GLONASS signals that support FDMA and CDMA decoding, or two separate receivers for GPS and GLONASS.

The primary receiver data processing system 14 may comprise any of the following: one or more hardware modules, one or more electronic modules, one or more software modules, an electronic data processor, an electronic data processor and associated electronic data storage, and a general purpose computer for executing software, logic or program instructions. Similarly, the secondary receiver data processing system 16 may comprise any of the following: one or more hardware modules, one or more electronic modules, one or more software modules, an electronic data processor, an electronic data processor and associated electronic data storage, and a general purpose computer for executing software, logic or program instructions. The electronic data processor (i.e., data processor) may comprise one or more of the following: a microprocessor, a programmable logic array, a digital signal processor, an application specific integrated circuit, a logic circuit, or another device for executing software, logic, arithmetic, or program instructions.

In FIG. 1, the primary receiver data processing system 14 comprises a primary decoder 48 (e.g., code division multiple access (CDMA) decoder), a primary phase measurement device 18, a real time kinematic (RTK) engine 20, and a data storage device 28. The real time kinematic (RTK) engine comprises a data processor 22, an error-reduction filter 24 (e.g., a predictive filter or Kalman filter), and an estimator 26 (e.g., a position estimator or a position and attitude estimator). The primary decoder 48, the primary phase measurement device 18, the real time kinematic engine 20, the data processor 22, the error-reduction filter 24, the estimator 26, the data storage device 28, and the primary receiver front end 12 may communicate with one another and the secondary receiver data processing system 16 via the data interface 38.

In FIG. 1, the secondary receiver data processing system 16 comprises a secondary decoder 50 (e.g., frequency division multiple access (FDMA) decoder), a secondary phase measurement device 30, a bias compensator 32, and a bias estimator 34. The secondary receiver data processing system 16 comprises a secondary decoder 50 (e.g., frequency division multiple access (FDMA) decoder), a secondary phase measurement device 30, a bias compensator 32, and a bias estimator 34 that may communicate with one another, the secondary receiver front end 13, and the primary receiver data processing system 14 via the data interface 38.

The data interface 38 may comprise one or more of the following: a data bus, electronic memory, shared memory, static links between software modules of the primary receiver data processing system 14, the secondary receiver data processing system 16, or both; dynamic links between software modules of the primary receiver data processing system 14, the secondary primary receiver data processing system 16, or both; data bus transceivers, or other software or hardware that supports the communication, sending, or receiving of data between different modules or components (48, 18, 20, 22, 24, 26, 28, 50, 30, 32, and 34) of the primary receiver data processing system 14 and the secondary receiver data processing system 16.

The lines that couple or interconnect (directly or indirectly) the primary receiver front end 12, the primary decoder 48, the primary phase measurement device 18, the real time kinematic engine 20, the data processor 22, the error-reduction filter 24, the estimator 26 and the data storage device 28, the secondary receiver front end 13, the secondary decoder 50, the secondary phase measurement device 30, the bias compensator 32, and the bias estimator 34 in FIG. 1 illustrate logical data paths, physical data paths, or both. A logical data path means a virtual data path or communication of data between software modules or between one or more software programs, for example. A physical data path means a transmission line or one or more data buses that support communications of data, logic level signals, electrical signals, or electromagnetic signals, for example.

The primary receiver front end 12 may comprise any suitable circuit for receiving satellite signals transmitted by one or more satellites (e.g., GPS navigation satellites). The receiver front end 12 may comprise a spread-spectrum receiver or code division multiple access receiver (CDMA) that is capable of receiving multiple carriers transmitted by one or more satellites within a constellation of satellites. For example, the receiver front end 12 may comprise a preamplifier or amplifier for amplifying satellite signals, a mixer and a reference oscillator, where the amplifier input is coupled to an antenna (e.g., antenna 15 or splitter 11), the amplifier output is coupled one mixer input, the reference oscillator is coupled to the other mixer input, and the mixer output is coupled to the primary receiver data processing system 14 or primary phase measurement device 18. In one illustrative embodiment, an analog-to-digital converter provides an interface between the receiver front end 12 and the primary receiver data processing system 14. In another illustrative embodiment, an output of analog-to-digital converter is further coupled to buffer memory and a data port transceiver.

The primary decoder 48 comprises a demodulator (e.g., CDMA demodulator) or other device for demodulating the pseudo-random noise code (e.g., course acquisition code (C/A) or other more precise civilian or military coding) that modulates one or more carriers. The GPS L1 carrier signal is modulated with the course acquisition (C/A) code and the encrypted precise code P(Y), whereas the GPS L2 signal is modulated with the encrypted P(Y) code. In one embodiment, the decoder 48 may comprise a code generator coupled to an input delay module, where an output of the delay module is coupled to a correlator for measuring the correlation between a reference pseudorandom noise code, which is delayable by known increments by the delay module, and a received pseudorandom noise code from a receiver front end 12. The primary decoder 48 may also facilitate decoding of the navigation information that modulates a carrier signal, such as ephemeris data.

The primary receiver data processing system 14 comprises the primary phase measurement device 18. The primary phase measurement device 18 comprises any device, integrated circuit, electronic module, or data processor for measuring the phase of a carrier signal. The primary phase measurement device 18 measures or estimates the observed phase of one or more carrier signals provided by the receiver front end 12. The measured phase may be expressed in integer wavelengths of the carrier signal, fractional wavelengths of the carrier signal, and/or degrees of the carrier signal.

The primary phase measurement device 18 may determine one or more of the following: (1) a first measured phase component of fractional wavelengths of the first carrier signal, the second carrier signal or both, and (2) a second measured phase component of whole wavelengths of the first carrier signal, the second carrier signal or both. The latter second measured phase component may be determined by a counter (e.g., zero-crossing counter) that counts transitions of a received, reconstructed or processed carrier signal that intersect with an X axis at a reference magnitude (e.g., 0 voltage) in the time domain, where X represents time and the Y axis represents magnitude of the carrier signal. However, the primary phase measurement device 18 relies upon further processing in the location-determining receiver 10 to determine or resolve a whole cycle integer ambiguity that may cause the second measured phase component to be in error or offset by a whole number of wavelength cycles (e.g., to estimate a distance or range between a corresponding satellite and the location-determining receiver 10).

The real time kinematic (RTK) engine 20 comprises a search engine, an ambiguity resolution module, or other software instructions for searching for or determining an integer ambiguity solution sets for the phase of one or more received carrier signals from multiple satellites. The data processor 22 may execute software instructions, mathematical operations, logic operations, or other commands provided by the ambiguity resolution module, for example. In one embodiment, the RTK engine 20 may define or limit the search space for the integer ambiguity solution set to limit the candidate ambiguity solutions sets that are evaluated. For the RTK engine 20, the integer ambiguity solutions sets refer to integer-cycle phase ambiguities in the received carrier phase of the received carrier signals (e.g., GPS L1 signal at 1.57542 GHz, the GPS L2 signal at 1.22760 GHz or similar signals) transmitted by one or more satellites, for example. The search engine may use a least squares or Kalman filtering techniques to reduce the search space or reach one or more ambiguity set solutions for the integer-cycle phase ambiguities of the carrier signals transmitted from the satellites.

The secondary receiver front end 13 may comprise any suitable circuit for receiving satellite signals transmitted by one or more satellites (e.g., GLONASS navigation satellites). The secondary receiver front end 13 may comprise a frequency division multiple access receiver (FDMA) that is capable of receiving multiple carriers transmitted by one or more satellites within a constellation of satellites. For example, the secondary receiver front end 13 may comprise a preamplifier or amplifier for amplifying satellite signals, a mixer and a reference oscillator, where the amplifier input is coupled to an antenna (e.g., antenna 15 or splitter 11), the amplifier output is coupled one mixer input, the reference oscillator is coupled to the other mixer input, and the mixer output is coupled to the secondary primary receiver data processing system 16 or secondary phase measurement device 30. In one illustrative embodiment, an analog-to-digital converter provides an interface between the secondary receiver front end 13 and the secondary primary receiver data processing system 16 or the data interface 38. In another illustrative embodiment, an output of analog-to-digital converter is further coupled to buffer memory and a data port transceiver.

The secondary decoder 50 comprises a demodulator (e.g., FDMA demodulator) or other device for demodulating GLONASS satellite signals that modulates one or more carriers. Each GLONASS satellite is capable of transmitting GLONASS signals that comprise the third carrier transmitted within a certain sub-channel of a GLONASS L1 band centered around 1.602 GHz, and the fourth carrier transmitted with a certain sub-channel of the GLONASS L2 band centered around 1.246 GHz, where the sub-channels are generally different for all of the satellites within view of the location determining receiver in accordance with a frequency reuse plan. The third carrier is modulated with a pseudo random ranging code, a navigation message, and an auxiliary meander sequence. The fourth carrier is modulated with a pseudo random ranging code and auxiliary meander sequence. The secondary 50 decoder may also facilitate decoding of the navigation information that modulates a carrier signal, such as ephemeris data.

The secondary receiver data processing system 16 comprises the secondary phase measurement device 30. The secondary phase measurement device 30 comprises any device, integrated circuit, electronic module, or data processor for measuring the phase of a carrier signal. The secondary phase measurement device 30 measures or estimates the observed phase of one or more carrier signals provided by the secondary receiver front end 13. The measured phase may be expressed in integer wavelengths of the carrier signal, fractional wavelengths of the carrier signal, and/or degrees of the carrier signal.

The secondary phase measurement device 30 may determine one or more of the following: (1) a first measured phase component of fractional wavelengths of the third carrier signal, the fourth carrier signal, or both, and (2) a second measured phase component of whole wavelengths of the third carrier signal, the fourth carrier signal, or both. The latter second measured phase component may be determined by a counter (e.g., zero-crossing counter) that counts transitions of a received, reconstructed or processed carrier signal that intersect with an X axis at a reference magnitude (e.g., 0 voltage) in the time domain, where X represents time and the Y axis represents magnitude of the carrier signal. However, the secondary phase measurement device 30 relies upon further processing in the location-determining receiver 10 to determine or resolve a whole cycle integer ambiguity that may cause the second measured phase component to be in error or offset by a whole number of wavelength cycles (e.g., to estimate a distance or range between a corresponding satellite and the location-determining receiver 10).

The real time kinematic (RTK) engine 20 comprises a search engine, ambiguity resolution module, or other software instructions for searching for or determining an integer ambiguity solution sets for the phase of one or more received carrier signals from multiple satellites (GLONASS and GPS). In one embodiment, the RTK engine 20 may define or limit the search space for the integer ambiguity solution set to limit the candidate ambiguity solutions sets that are evaluated. For the real time kinematic engine 20, the integer ambiguity solutions sets refer to integer-cycle phase ambiguities in the received carrier phase of the received carrier signals (e.g., of the GLONASS satellite carrier signals) transmitted by one or more satellites, for example. The search engine may use a least squares or Kalman filtering techniques to reduce the search space or reach one or more ambiguity set solutions for the integer-cycle phase ambiguities of the carrier signals transmitted from the satellites.

The data processor 22 comprises a data processor or other data processing device for controlling the primary receiver data processing system 14, the secondary receiver data processing system 16, or both. The data processor 22 can execute any executable instructions, arithmetic operations, logic operations, or perform other tasks required by the location-determining receiver (e.g., 10), the primary receiver data processing system (e.g., 14), or the secondary receiver data processing system (e.g., 16).

In one configuration, the data processor 22 comprises a mode selection module that determines whether the location-determining receiver operates in a primary mode, a secondary mode, or a hybrid mode. In the primary mode, the primary receiver data processing system 14 is active and the location-determining receiver 10 determines its position with reference to the GPS satellite constellation. In the secondary mode, the secondary receiver data processing system 16 and a supporting portion of the primary receiver data processing system 14 are active, and the location-determining receiver 10 determines its position with reference to the GLONASS satellite constellation. In the hybrid mode, both the primary receiver data processing system 14 and the secondary receiver data processing system 16 are active and the location-determining receiver 10 estimates its position with reference to both the GPS satellite constellation and the GLONNASS satellite constellation for increased precision that would not otherwise be available in the absence of the GLONNASS satellite signals. In one embodiment, the data processor 22 may prohibit one or more operational modes depending upon a subscription purchased by an end user of the location-determining receiver 10.

In one embodiment, the data processor 22 may comprise a signal reliability detector that provides one or more of the following: the number of satellite signals received from the GPS constellation above threshold signal strength, the number of satellite signals received from the GLONASS satellite constellation above a threshold signal strength, a dilution of precision (DOP), bit-error rate, word-error rate or frame-error rate of the decoded course acquisition code of the L1 signal of the GPS signal or the decoded standard code of the GLONASS signal, or another figure of merit or reliability level of one or more received satellite signals. The data processor 22 may determine (e.g., by reference to a look-up table stored in the data storage device 28, or by a Boolean logic function or other program instructions executable by the data processor 22) whether to operate in the primary, secondary or hybrid mode based on the reliability of one or more received satellite signals (e.g., GPS signals, GLONASS signals, or both).

In one configuration, the data processor 22 further comprises controlling the real time kinematic engine 20, or the output of the real time kinematic engine 20. The data processor 22 may send control data to activate, deactivate, reset, reinitialize, start, or stop one or more of the following: GLONASS-related states and inputs, GPS-related states and inputs, or all inputs and states of the primary real time kinematic engine 20. The data processor 22 manages the reinitializing, resetting, partial reinitializing, partial resetting, stopping and starting up of the real time kinematic engine 20 based on whether the data processor 22 selects the primary mode, the secondary mode or the hybrid mode. In a partial reinitialization or reset, the RTK engine 20 preserves GPS-related inputs and states, while only initializing or resetting GLONASS-related inputs and states, or vice versa. Partial reinitialization may be used to clear corrupt states or inputs associated with the phase measurements of the GPS signals, the phase measurements of the GLONASS signals, whereas full reinitialization may be used to clear corrupt states or inputs associated with both the GPS signals and the GLONASS signals.

In an alternate embodiment, the above partial reinitialization or resetting may be realized by using separate predictive filters, where a first predictive filter is used solely for the GPS signal processing and a second predictive filter is used for the combined GPS and GLONASS signal processing to avoid disruption where GLONASS ambiguity solutions are corrupt or reception of GLONASS satellite signals is not sufficiently reliable over a certain time period (e.g., one or more GPS epochs).

The error-reduction filter 25 comprises a Kalman filter or variant thereof for reducing or mitigating errors, such as measurement error. A Kalman filter may comprise a predictive filtering device or circuit that uses summation of signals, delay, and feedback to process data and compensate for the effects of noise and uncertainty in measured data or otherwise. Resetting or reinitialization may refer the same the reinitialization of the states of the error reducing or Kalman filter.

The bias estimator 34 may estimate a bias, which may include, but is not limited to, one or more of the following biases: (a) an inter-channel bias between different carrier frequencies transmitted from two or more secondary satellites (e.g., GLONASS satellites) and received at the location-determining receiver (e.g., 10) or a reference station (e.g., 40 or 41), (b) phase measurement bias between different carrier phase measurements in GLONASS observable at the location-determining receiver (e.g., 10) or a reference station (e.g., 40 or 41), (c) pseudo code bias between different pseudo ranging measurements in GLONASS observable at the location-determining receiver (e.g., 10) or a reference station (e.g., 40 or 41), (d) satellite clock biases associated with different GLONASS satellites, (e) a hardware bias or receiver processing bias (e.g., receiver clock bias) between different hardware configurations (e.g., different manufacturers) of GLONASS receivers, and (f) hardware and receiver-processing bias between the primary receiver front end 12 and the secondary receiver front end 13, for example.

The bias compensator 32 prepares bias compensation data for the error-reduction filter 24, the data processor 22, or the real time kinematic engine 20 to address the bias estimates provided by the bias estimator 34. For example, the bias compensation data may comprise input data or states for the error-reduction filter 24, limits on the search space of the search engine of the real time kinematic engine 20, or modification of output solutions of the estimator 26, the error-reduction filter 24, or both.

The reference station 40 comprises a reference location-determining receiver at a known or fixed location, a reference data processing system, and a transmitter or transceiver. In one embodiment, the reference location-determining receiver detects carrier phase data associated with one or more carrier signals and determines an initial ambiguity solution or ambiguity solution set for multiple satellite signals received, where the initial ambiguity solution or ambiguity solution set can be applied at the location-determining receiver 10. The reference data processing system of the reference station 40 receives carrier phase data and the initial ambiguity solution corrects it, by using the known or fixed location of the reference location-determining receiver, to determine an enhanced ambiguity solution. In one example, corrected carrier phase data comprises the estimated carrier phase and the enhanced ambiguity solution, or other data derived therefrom. In turn, the corrected carrier phase data is transmitted via a wireless signal or electromagnetic signal to the correction receiver 36. The correction receiver 36 receives the corrected carrier phase data which is available for use by at least one the real time kinematic engine 20, the error-reduction filter 24, or by the estimator 26 to determine a position of the vehicle or object associated with the location-determining receiver 10.

The estimator 26 comprises a data processor or other data processing device for estimating a position, attitude, or both of an object or vehicle associated with the location-determining receiver 10. The estimator 26 communicates with a remainder of the real time kinematic engine 20, the bias compensator 32, the bias estimator 34, and the data processor 22. Once the integer ambiguity solutions set is determined, the estimator 26 or location-determining receiver 10 can use the phase carrier measurement data to provide an accurate estimation of the distance or range between each satellite and the location-determining receiver 10 based on the known propagation speed (i.e., speed of light). In turn, the ranges between three or more satellites and the location-determining receiver 10 can be used to estimate the position or attitude of the receiver. Four satellites (e.g., GPS navigation satellites) are necessary to determine a three dimensional position that includes elevation with respect to the Earth's surface. To determine attitude of the vehicle or object associated with the location-determining receiver 10, two positions of the vehicle are estimated in close proximity in time or two separate antennas are used for the location-determining receiver 10.

The estimator 26 may use one or more of the following data sources to determine an estimated position or attitude of the antenna of the location determining receiver or an associated object or vehicle: the decoded pseudo random noise code of the GPS satellite signals, the decoded pseudo random ranging code of the GLONASS satellite signals, the carrier phase measurement data of the GPS satellite signals, the GLONASS satellite signals, or both; the encrypted precise code (e.g., P(Y) code) of the GPS satellite signals (where authorized by applicable governmental authorities), the precise code of the GLONASS satellites signals (where authorized by applicable governmental authorities), the course acquisition code of GPS satellite signals, the standard precision code of the GLONASS satellite signals, navigation information, and integer-cycle phase ambiguity data, bias compensation data (e.g., from the bias compensator 32), and reference station carrier phase data (e.g., from reference station 40 or 41), where the reference station carrier phase data may be integrated in the integer-cycle phase ambiguity data. In one embodiment, the estimator 26 or the data processor 20 may delay GPS coordinate solutions (e.g., by time delay circuitry or data processing techniques) to align with corresponding GLONASS coordinate solutions to account for processing time differences in the location-determining receiver 10, such that the solutions apply to substantially the same position of the object or vehicle in real time.

Figure 2:
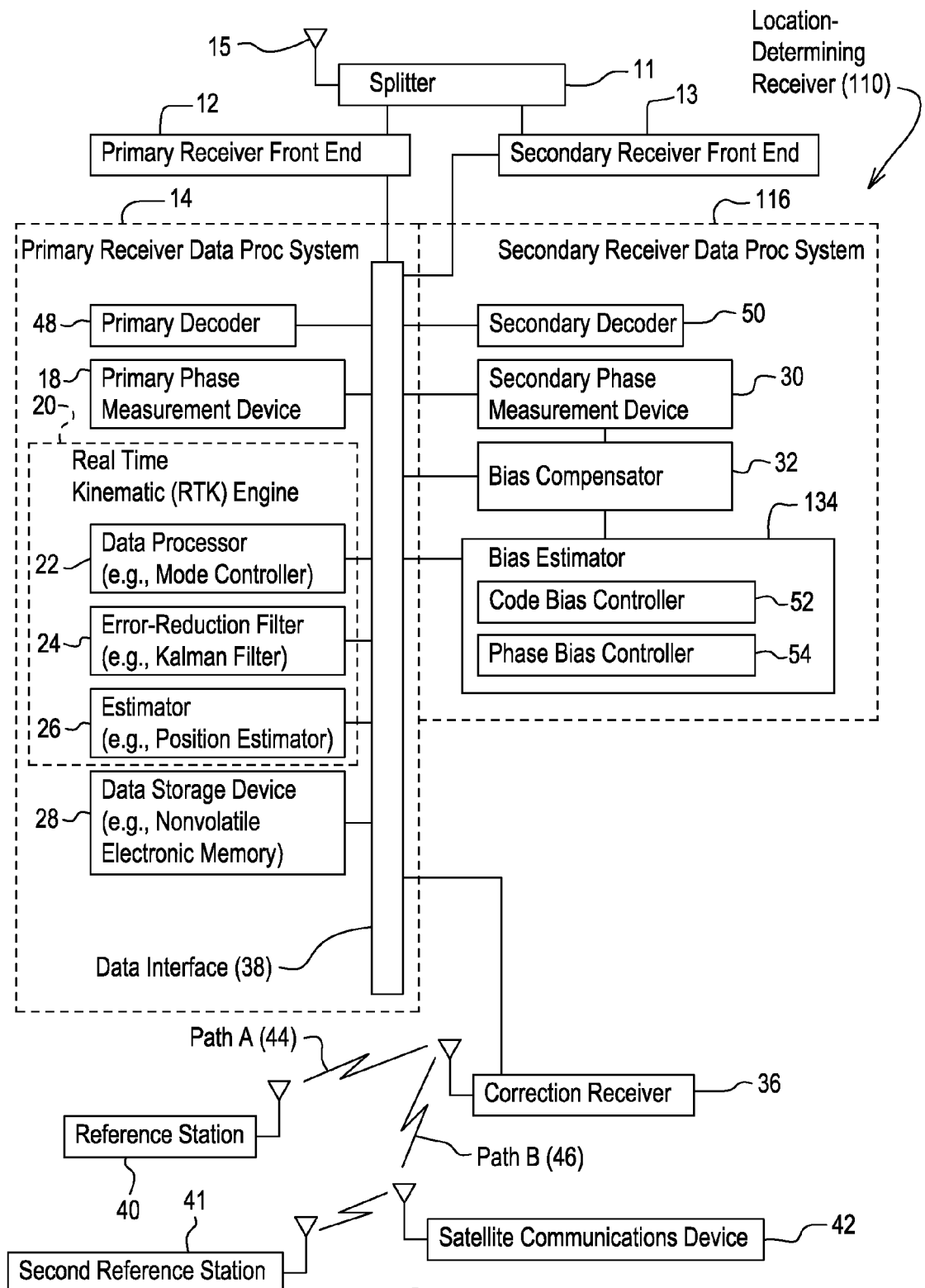
FIG. 2 is a block diagram of a second embodiment of a system for estimating position with bias compensation.

The second embodiment of the location-determining receiver 110 of FIG. 2 is similar to the first embodiment of the location-determining receiver 10 of FIG. 1, except in the second embodiment of FIG. 2 the location-determining receiver 110 comprises a secondary receiver data processing system 116 with a bias estimator 134 that further comprises a code bias controller 52 and a phase bias controller 54. Like reference numbers in FIG. 1 and FIG. 2 indicate like elements.

The code bias controller 52 manages or controls execution of one or more equations that are applied to estimate or determine code bias or corresponding code compensation data for combining primary decoded position data associated with the pseudo random noise code (e.g., course acquisition code) of the GPS satellite system with secondary decoded position data associated with pseudo random ranging code (e.g., encoded standard position data) of the GLONASS satellite system.

In an alternate non-civilian configuration (e.g., military configuration), the code bias controller 52 manages or controls execution of one or more equations that are applied to determine or estimate code bias or corresponding code compensation data for combining primary decoded position data associated with the pseudo random noise code (e.g., precise code or P(Y) code) of the GPS satellite system with the secondary decoded position data associated with pseudo random ranging code (e.g., encoded high precision position data) of the GLONASS satellite system.

The phase bias controller 54 manages or controls execution of one or more equations that are applied to estimate or determine phase bias or corresponding phase compensation data for combining primary phase measurement data (e.g., from the primary phase measurement device 18) of the GPS satellite system with secondary phase measurement data (e.g., from the secondary phase measurement device 30) of the GLONASS satellite system. For example, the phase bias controller 54 may manage the use of single difference or double difference phase measurements to enhance the accuracy of the position determination by supporting the integration or use of both the GPS satellite signals and the GLONASS satellite signals by the estimator 26 to determine at least one of the position or the attitude of the location-determining receiver 110, its antenna, or a vehicle or object attached thereto.

Figure 3:
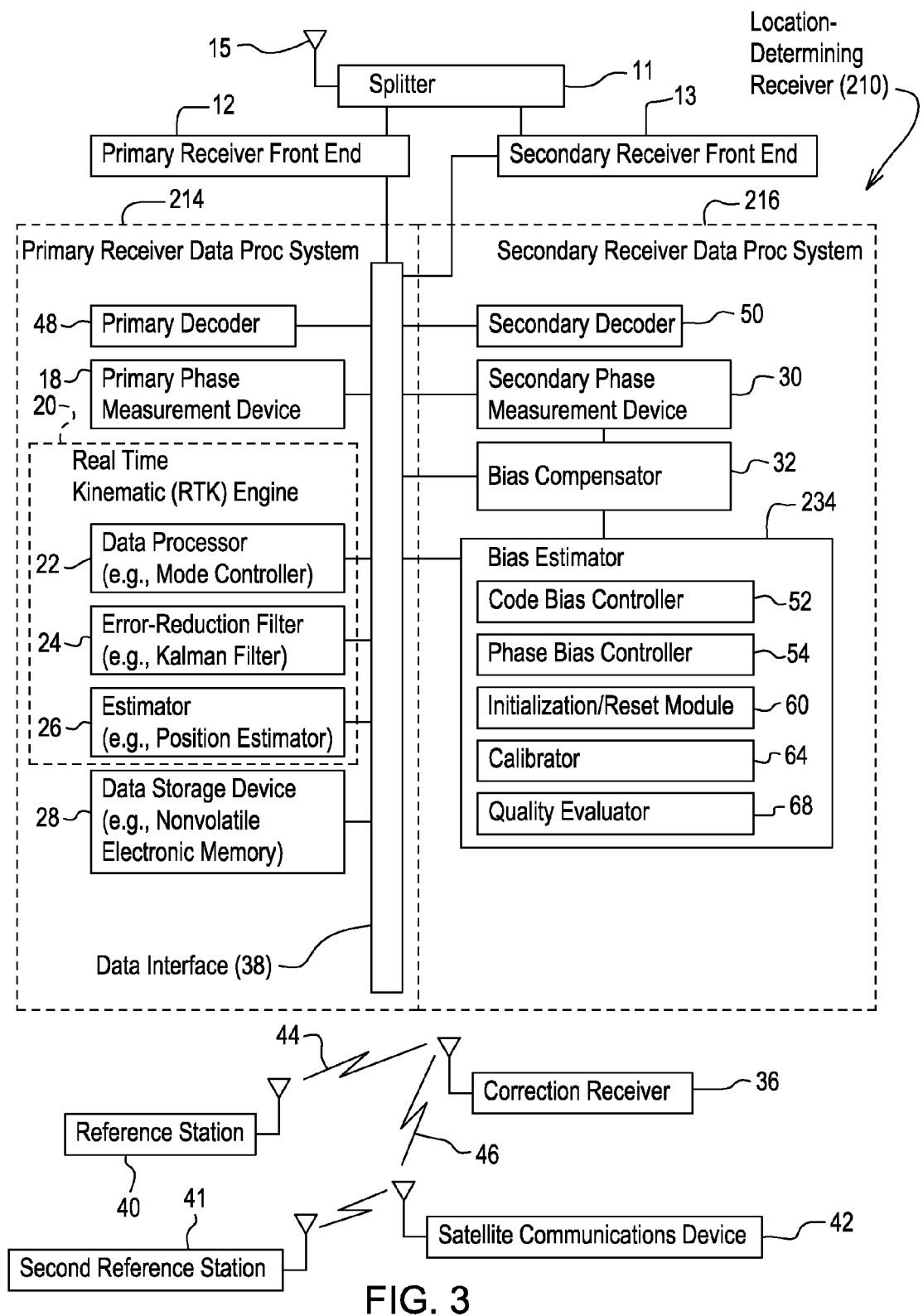
FIG. 3 is a block diagram of a third embodiment of a system for estimating position with bias compensation.

The third embodiment of the location-determining receiver 210 of FIG. 3 is similar to the second embodiment of the location-determining receiver 110 of FIG. 2, except the location-determining receiver 210 of FIG. 3 comprises a bias estimator 234. Like reference numbers in FIG. 1, FIG. 2, and FIG. 3 indicate like elements.

The bias estimator 234 comprises a code bias controller 52, a phase bias controller 54, an initialization/reset module 60, a calibrator 64 and a quality evaluator 68.

The initialization/reset module 60 comprises instructions or logic for establishing initial bias data in accordance with a bias initialization procedure that operates in a first mode or a second mode, where in the first mode stored bias data is accessed or retrieved from a look-up table stored in a data storage device (nonvolatile RAM) associated with the location determining receiver to populate a primary real time kinematic engine, where in the second mode stored bias data provides course initial data comprising a pre-programmed default bias associated with corresponding hardware of the location-determining receiver.

The bias estimator 234 comprises instructions or software for assigning time stamps for corresponding single difference carrier phase measurements or pseudo random noise code measurements associated with the secondary satellites and for associated variances.

The calibrator 64 comprising a software module, a hardware module, or a combination thereof for calibrating the compensation for the inter-channel bias in accordance with a single differenced calibration to allow for changes in the satellites received or available to the location determining receiver by converting the double difference post fit residuals into single difference residuals. For example, the calibrator may be executed by the arithmetic logic unit of a data processor, such as the data processor 22.

A quality evaluator 68 comprises a software module, an electronic module, or both for monitoring a quality level of the compensation factor. In configuration, the quality evaluator bases the quality level on whether there is a significant jump or abrupt change in the magnitude of the compensation factor over a sample time period. In another configuration, the quality evaluator bases the quality level on an occurrence of the significant jump and whether a RAIM algorithm flags a single difference code solution or a single difference carrier phase solution as unreliable.

Figure 4:
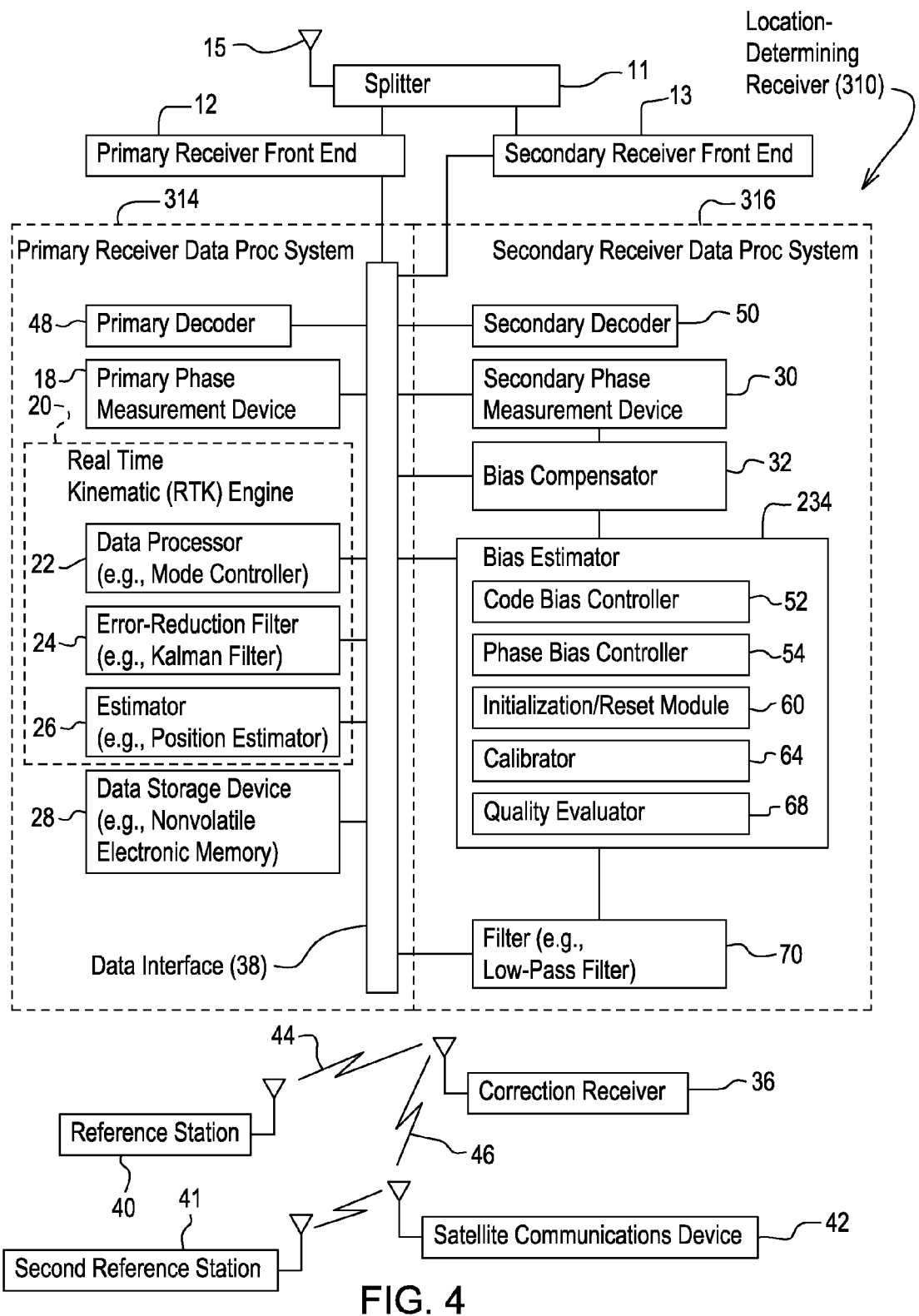
FIG. 4 is a block diagram of a fourth embodiment of a system for estimating position with bias compensation.

The fourth embodiment of the location-determining receiver 310 of FIG. 4 is similar to the third embodiment of the location-determining receiver 210 FIG. 3, except the secondary receiver data processing system 316 of FIG. 4 further comprises a filter 70 (e.g., low pass filter). Like reference numbers in FIG. 1 through FIG. 4, inclusive, indicate like elements.

The filter 70 has an input coupled to the bias estimator 234 (or the bias compensator 32) and an output in communication to at least one of the RTK engine 20, data processor 22, the error-reduction filter 24, the estimator 26, and the data storage device 28.

Figure 5:
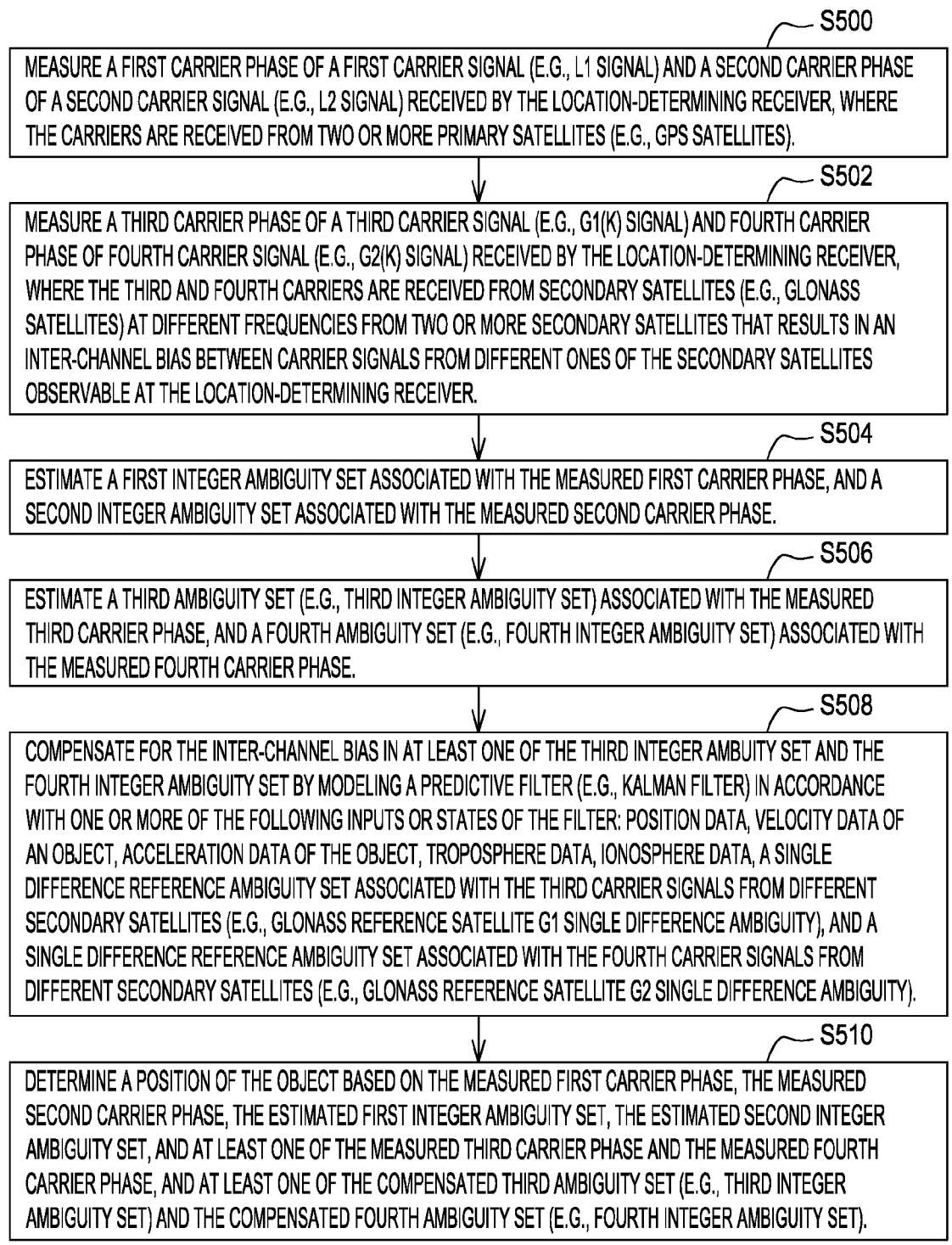
FIG. 5 is a flow chart of a first example of a method for estimating position with bias compensation.

FIG. 5 discloses a flow chart in accordance with a first example of estimating position, attitude, or both of an object or vehicle with bias compensation to support combined use of Global Positioning System (GPS) satellite transmissions and GLONASS (Global Navigation Satellite System) satellite transmissions. The method of FIG. 5 begins in step S500.

In step S500, a primary receiver data processing system 14 or the primary phase measurement device 18 measures a first carrier phase (e.g., L1 GPS signal) and a second carrier phase (e.g., L2 GPS signal) received by the location determining receiver (e.g., 10, 110, 210 or 310), where the carriers are received from two or more primary satellites (e.g., GPS satellites). The location-determining receiver (e.g., 10, 110, 210 or 310) is mounted on or associated with an object or a vehicle, or an implement associated with the vehicle.

In step S502, a secondary receiver data processing system 16 or the secondary phase measurement device 30 measures a third carrier phase of a third carrier signal (e.g., G1(K) or GLONASS L1 sub-band signal) and a fourth carrier phase of a fourth carrier signal (e.g., G2(K) or GLONASS L2 sub-band signal) received by the location-determining receiver (10, 110, 210 or 310), where the third and fourth carriers are received from secondary satellites at different frequencies from two or more secondary satellites that result in an inner-channel bias between carrier signals from different ones of the secondary satellites observable at the location-determining receiver (10, 110, 210 or 310).

Satellites in the GLONASS and GPS constellations transmit signals in two different bands referred to as L1 and L2. The sub-bands in for the L1 and L2 bands may be referred to as G1 and G2 for the GLONASS constellation. In the GLONASS system, each satellite is generally allocated a particular frequency or sub-band within a band, given by the following expressions:

$G1(K)=1602$ MHz$+K*9/16$ MHz in the $L1$ band and $G2(K)=1246$ MHz$+K*7/16$ MHz in the $L2$ band, where K is a frequency number (frequency channel) of the signals transmitted by GLONASS satellites in the G1 and G2 sub-bands correspondingly. As of the time drafting this document, the GLONASS satellites used frequency channels in the range K=(−7 to +6). GLONASS satellites launched since 2005 use filters which limit out-of-band emissions to the harmful interference limit contained in CCIR Recommendation 769 for the 1610.6 MHz-1613.8 MHz and 1660 MHz-1670 MHz bands.

If GLONASS observation are included to enhance GPS RTK performance in the location determining receiver (10, 110, 210 or 310), significant GLONASS inter-channel biases may exist in both GLONASS pseudo-range and carrier phase observations. The inter-channel biases result from signal propagation differences, hardware variations, signal processing differences, and other factors that are impacted by the different signal frequencies received from the GLONASS satellites. Because of the inter-channel biases, instantaneous ambiguity resolution of the GLONASS carrier phase observations with state-of-the-art GPS techniques becomes quite difficult, and may even fail if GLONASS inter-channel biases are ignored. Further complications result where the reference station (e.g., 40 or 41) and the location-determining receiver (e.g., 10, 110, 210 or 310) are made by different manufacturers (or even when different models from the same manufacturer are used). A location determining receiver (e.g., 10, 110, 210 or 310) and the reference station (40 or 41), may contain receiver circuitry (e.g., microwave filters or amplifiers) that differs or may not respond with uniform delay over an entire bandwidth of the GLONASS L1 and L2 signals, for instance. Sometimes the receiver circuitry uses different reference clocks for the GPS and the GLONASS receiver circuitry, which can be accounted for by proper processing.

In step S504, the data processor 22 or the real time kinematic engine 20 estimates a first integer ambiguity set associated with the measured first carrier phase, and a second integer ambiguity set associated with the measured second carrier phase. Step S504 may be executed in accordance with various alternate techniques that may be applied individually or cumulatively. Under a first technique, in one embodiment the data processor or the RTK engine 20 may estimate the first integer ambiguity set and the second integer ambiguity set, if the signal quality of the GPS carrier signals received at the location-determining receiver (e.g., 10, 110, 210 or 310) is greater than a threshold signal quality level (e.g., determined at the primary receiver front end 12, the primary decoder 48, or the primary phase measurement device 18) for at least a minimum number of satellites in the GPS constellation.

Under a second technique, a data processor or 22 or real-time kinematic engine 20 estimates the first integer ambiguity set and the second integer ambiguity set by a process (e.g., a search process, a least squares solution process, or a weighted least squares solution process) and by calculating the double difference reference ambiguity set associated with first carrier signals from different primary satellites (e.g., GPS L1 DD Ambiguity). Further, the data processor or 22 or real-time kinematic engine 20 estimates first integer ambiguity set and the second ambiguity set by calculating the double difference reference ambiguity set associated with second carrier signals from different secondary satellites (e.g., GPS L2 DD Ambiguity).

"Double difference," "DO" or "double-differenced" refers to a mathematical operation that may be applied to carrier phase or pseudo range measurements. Here, in step S504, double difference operations may be applied to GPS floating carrier phase ambiguities or fixed carrier phase ambiguities. The double difference may be determined by subtracting two single difference GPS carrier phase measurements between a location determining receiver and a reference location-determining receiver (e.g., reference station 40 or 41) with respect to the same two satellite signal from two different satellites. The double difference operation is used to reduce or ameliorate GPS satellite clock error and atmospheric signal propagation bias.

In step S506, the data processor 22 or the real time kinematic engine 20 estimates a third ambiguity set (e.g., third integer ambiguity set) associated with the measured third carrier phase, and a fourth ambiguity set (e.g., fourth integer ambiguity set) associated with the measured fourth carrier phase. Step S506 may be executed in accordance with various alternate techniques that may be applied individually or cumulatively. Under a first technique, the data processor or the RTK engine 20 may estimate the third ambiguity set and the fourth ambiguity set, if the signal quality of the GLONASS carrier signals received at the location-determining receiver (10, 110, 210 or 310) is greater than a threshold signal quality level (e.g., determined at the secondary receiver front end 13, the secondary decoder 50, or the secondary phase measurement device 30) for at least a minimum number of satellites in the GLONASS constellation. In step S506, the data processor 22 or real time kinematic engine 20 is well-suited for resolving ambiguities (e.g., integer ambiguities) in the measured third carrier phase and fourth carrier phase, where inter-channel bias is considered before, after or simultaneously with the resolving of the ambiguities in conjunction with step S508, for example.

Under a second technique for carrying out step S506, the data processor 22 or real-time kinematic engine 20 estimates the third ambiguity set (e.g., integer ambiguity set) and the fourth ambiguity set (e.g., fourth integer ambiguity set) in a process (e.g., solution or search process) that includes applying single difference operations, double difference operations, or both to the measured third carrier phase and the measured fourth carrier phase. The third ambiguity set and the fourth ambiguity set of step S506 may represent partial solutions, iterative solutions, intermediate solutions or complete solutions for the third integer ambiguity set and the fourth integer ambiguity set of the third carrier phase and the fourth carrier phase. For example, an initial or partial ambiguity set solution may rely upon a partial solution (e.g., half-integer solution or a inter-channel biased solution) or GPS carrier phase measurements to define the search space for an optimal solution of the GLONASS third integer ambiguity and fourth integer ambiguity. If the result of step S506 is a partial solution, iterative solution or intermediate solution, the complete bias-compensated solution for a time period (e.g., an epoch) is finally determined in real time by the data processor 22 or the real-time kinematic engine in conjunction with step S508, for example. The complete, bias compensated solution that accounts for inter-channel bias may be referred to as the compensated third integer ambiguity set and the compensated fourth integer ambiguity set. The data processor 22 or real time kinematic engine 20 is well-suited for resolving ambiguities (e.g., integer ambiguities) the measured third carrier phase and fourth carrier phase in real time, where inter-channel bias (e.g., of step S508) is considered before, after or simultaneously with the resolving of the ambiguities (e.g., in step S506).

Inter-channel bias in the carrier phase measurement is often realized because of the FDMA modulation scheme, in which each GLONASS satellite transmits from a different frequency or sub-band within the GLONASS L1 and L2 band. The location-determining receiver (10, 110, 210 or 310) is susceptible to inter-channel bias, which refers to frequency dependent bias in the above third and fourth carrier phase measurements. Further, the inter-channel bias may also include a pseudo range code bias that is not discussed in the method of FIG. 5, but is referred to elsewhere in this document.

In step S508, the error-reduction filter 24 (e.g., a predictive filter or Kalman filter) or real time kinematic engine compensates for the inter-channel bias in at least one of the third integer ambiguity set and the fourth integer ambiguity set by modeling the error reduction filter 24 in accordance with one or more of the following inputs or states of the filter: motion data (e.g., position data of the object, velocity data of the object, acceleration data of the object), troposphere data (e.g., residual troposphere data), ionosphere data, a single difference reference ambiguity set associated with third carriers signal from different secondary satellites (e.g., GLONASS reference satellite G1(K) single difference ambiguity) observed at the location-determining receiver (10, 110, 210 or 310) and the reference station (e.g., 40 or 41), and a signal difference reference ambiguity set associated fourth carrier signals from different secondary satellites (e.g., GLONASS reference satellite G2(K) single difference ambiguity) observed at the location-determining receiver (10, 110, 210 or 310) and the reference station (e.g., 40 or 41).

"Single difference," "SD" or "single-differenced" shall refer to a single difference mathematical operation that may be applied to carrier phase or pseudo range measurements observed at the location-determining receiver (10, 110, 210 or 310) and the reference station (40 or 41). With respect to GLONASS measurements, the single difference is determined by subtracting measurements (e.g., third carrier phase measurements or fourth carrier phase measurements) between a location determining receiver and a reference station (i.e., reference location-determining receiver) with respect to the same satellite signal. In general, the single difference is based on a first measurement (e.g., carrier phase measurement of a first carrier, second carrier, third carrier or fourth carrier) of a particular satellite signal (e.g., from a particular satellite) at the location-determining receiver (10, 110, 210 or 310) and second measurement (e.g., of a carrier phase measurement of the same first carrier, second carrier, third carrier or fourth carrier) of the particular satellite signal at a reference station (e.g., reference station 40 or 41), where the first measurement is subtracted from the second measurement, or vice versa. The first measurement and the second measurement usually are taken during the same epoch or over another applicable time period in which the carrier phase measurements of the same carrier signal are sufficiently correlated.

The single-differenced carrier phase observable between two receivers tracking the same satellite can be expressed as:

$$\lambda_k \Delta \phi_k = \Delta \rho_k + \lambda_k \Delta N_k + c \cdot \Delta dT_k + \Delta CB_k - \Delta I/f_k^2 + \Delta d_k^{trop} + \epsilon_{\Delta \phi_k}, \quad (1)$$

where $\Delta \phi_k$ is the single-differenced carrier phase observable expressed in units of cycles; $\lambda_k$ and $f_k$ are the wavelength and frequency of the carrier wave; $\Delta N_k$ is the single-differenced integer ambiguity; c is the speed of light; $\Delta I/f_k^2$ is the single-differenced ionospheric delay, where I is a function of the Total Electron Content; $\Delta d_k^{trop}$ is the single-differenced tropospheric delay; and $\epsilon_{\Delta \phi_k}$ is the carrier phase observation noise; $\Delta \rho_k$ is the single-differenced geometry distance; $\Delta dT_k$ is the difference between the two receiver clock biases; and $\Delta CB_k$ is the inter-channel bias for single-differenced (SD) carrier phase measurements; and k represents the GPS L1 or L2 or the GLONASS G1 or G2 frequency. $\Delta CB_k$ is not the same for different GLONASS satellites or when receivers from different manufacturers or different types from the same manufacturer are used for the RTK base and rover receivers.

In one embodiment, the single difference phase measurements can be used to cancel out satellite clock error and atmospheric signal propagation bias (e.g., ionosphere bias, but not necessarily troposphere bias). In another embodiment, if the bias estimator (34, 134, or 234) can estimate reliably the inter-channel bias, the data processor 22, the error reduction filter 24, or the real time kinematic engine 20 can use the single difference phase measurements as a primary source of information to determine reliable carrier phase ambiguity solution sets for the third integer ambiguity set and the fourth integer ambiguity set (e.g., in step S506 or otherwise).

The current state-of-the art hardware design of the GPS portion of the location-determining receiver tends to provide substantially identical (e.g., almost identical) inter-channel carrier phase biases for different GPS satellites at the L1 frequency, and substantially identical inter-channel carrier phase biases for different GPS satellites at the L2 frequency.

However, the GPS L2 biases are different from the GPS L1 biases. In contrast, the current state-of-the-art hardware design of the GLONASS portion of the location receiver is typically burdened with different inter-channel biases for different GLONASS G1(K) frequencies which are denoted as for code. There are different inter-channel biases for different GLONASS G2 frequencies (and different from the inter-channel bias for GLONASS G1(K) frequencies) which are denoted as for code. When the location-determining receiver (10, 110, 210 or 310) and base receivers (e.g., reference stations 40 or 41) are from different manufacturers or of different types, the inter-channel biases and will not remain zero. Typically, the GLONASS inter-channel biases exhibit a different constant bias behavior for different GLONASS satellites over a short period of time. The GLONASS inter-channel biases may slowly vary for the same receiver type due to component variations, age, temperature change, or other factors.

Because of the different signal frequencies for the GLONASS satellites, the commonly used double-difference procedure for GPS carrier phase data processing cannot be implemented in its straightforward form for the GLONASS third carrier phase and fourth carrier phase measurements. Step S508 may support double-difference procedures, where the inter-channel bias, receiver clock bias, cycle slip, and other technical considerations are properly addressed. The method of FIG. 7 describes several illustrative techniques for applying double difference procedures in step S507 which may be applied in conjunction with step S508, or otherwise, for example.

In step S510, the estimator 26 or primary receiver data processing system 14 estimates a position of the object based on the measured first carrier phase, the measured second carrier phase, the estimated first integer ambiguity set, the estimated second integer ambiguity set, and at least one of the measured third carrier phase and the measured fourth carrier phase, and at least one of the compensated third integer ambiguity set and the compensated fourth integer ambiguity set.

Figure 6:
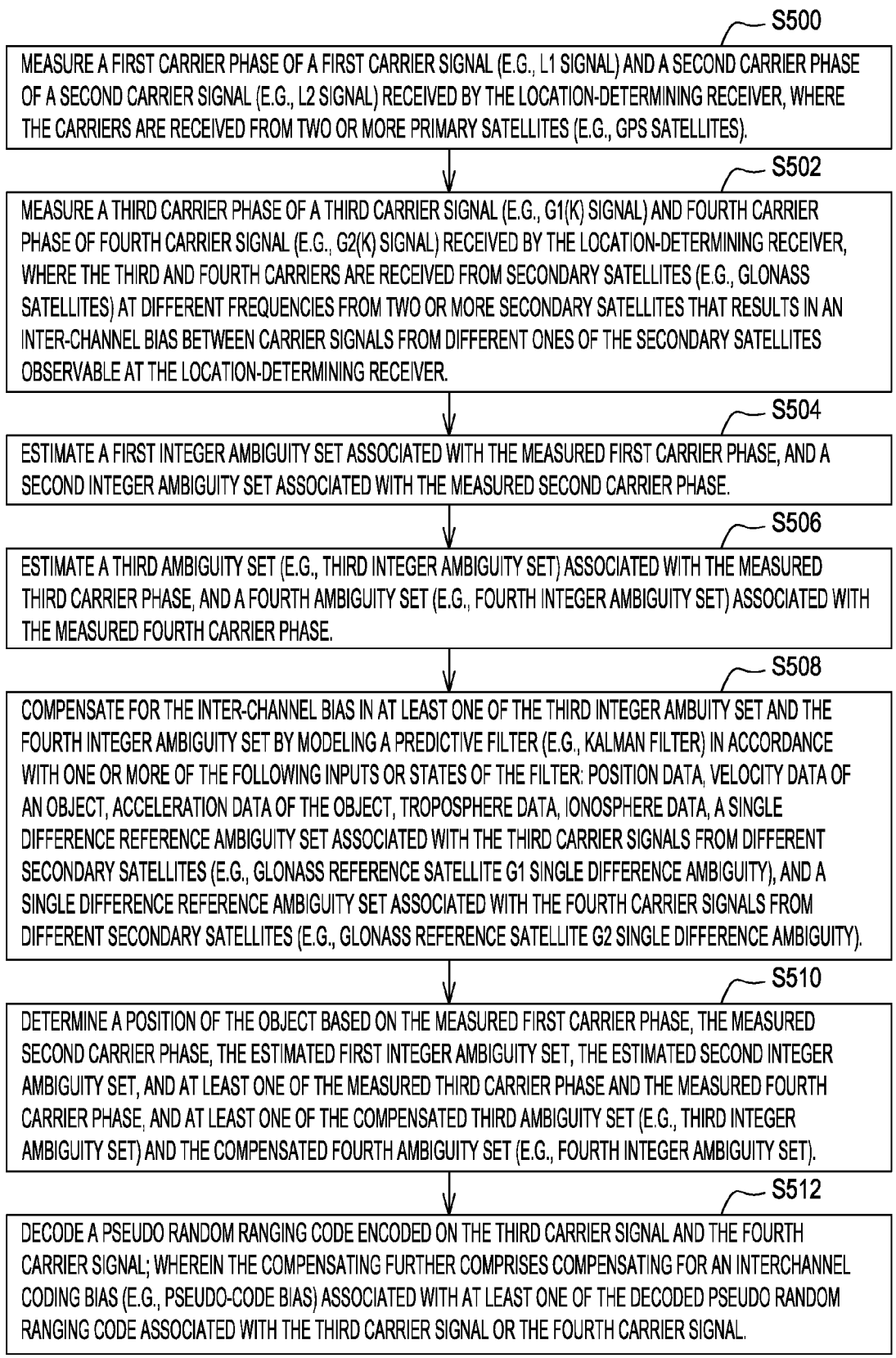
FIG. 6 is a flow chart of a second example of a method for estimating position with bias compensation.

The method of FIG. 6 is similar to the method of FIG. 5, except the method of FIG. 6 further comprises step S512. Step S512 may be performed prior to, after or simultaneously with step S510, for example. Like reference numbers in FIG. 5 and FIG. 6 indicate like steps or procedures.

In step S512, a secondary decoder 50 decodes a pseudo random ranging code encoded on the third carrier signal and the fourth carrier signal; wherein the compensating further comprises compensating for an inter-channel bias (e.g. inter-channel coding bias) associated with at least one of the decoded pseudo random ranging code associated with the third carrier signal or the fourth carrier signal. In one example, the single difference pseudo range code measurements are determined to estimate inter-channel code bias.

The pseudo-range measurement functional model has a similar form to the carrier phase model (note that similar notation is used, but code bias may have a different meaning than in the case for carrier phase measurements):

$$\Delta P_k = \Delta \rho_k + c \cdot \Delta dT_k + \Delta PB_k + \Delta I/f_k^2 + \Delta d_k^{trop} + \epsilon_{\Delta P_k}, \quad (2)$$

where $\Delta PB_k$ inter-channel code bias and $\epsilon_{\Delta P_k}$ is pseudo range noise. More description is needed for the terms of $\Delta CB_k$ and $\Delta PB_k$ because they represent both the difference between the GPS and GLONASS systems and the inter-channel or frequency biases between different frequencies. It should be noted that all satellite dependent biases such as satellite clock error are canceled after differencing between two receivers.

For current state of the art location determining receivers, there are almost identical inter-channel code biases for different GPS satellites at the L1 frequency. Similarly, there are almost identical inter-channel code biases for different GPS satellites at the L2 frequency However, the L2 biases are different from the L1 biases. If the GPS L1 and L2 frequencies are chosen as reference frequencies, the receiver clock bias is then determined by using pseudo-range measurements on these frequencies, and denoted as $\Delta dT_k$. $\Delta CB_k$ and $\Delta PB_k$ for the GPS L1 and L2 frequencies will then remain zero.

However, the inter-channel biases have to be considered for GLONASS pseudo-range measurements, especially for different manufacturers and/or receiver types. There are different inter-channel biases for different GLONASS G1 frequencies which are denoted as $\Delta CB_{GLNG1}(k)$ for code. There are different inter-channel biases for different GLONASS G2 frequencies (and different from the inter-channel bias for GLONASS G1 frequencies) which are denoted as $\Delta CB_{GLNG2}(k)$ for code.

Figure 7:
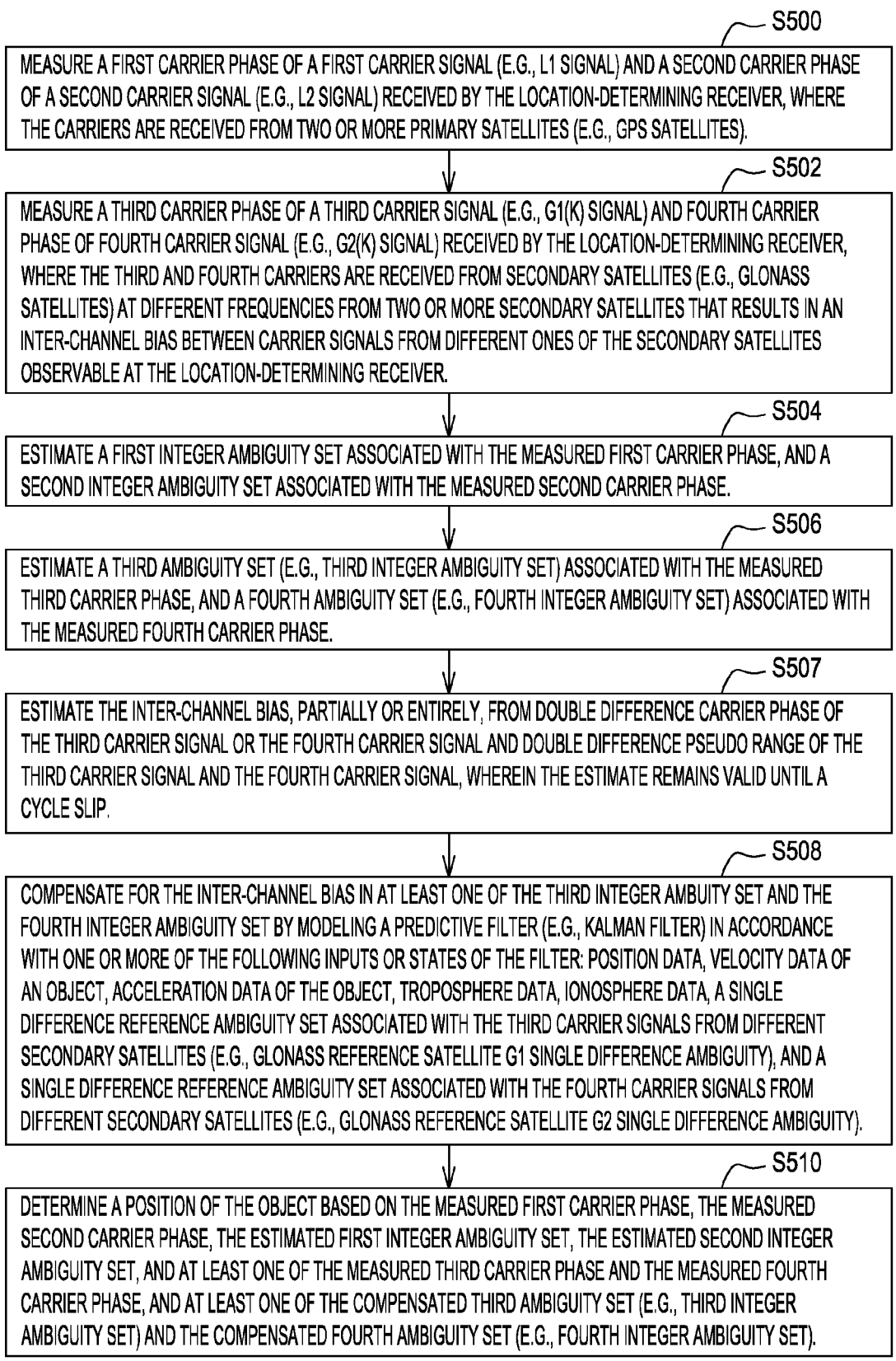
FIG. 7 is a flow chart of a third example of a method for estimating position with bias compensation.

The method of FIG. 7 is similar to the method of FIG. 5, except the method of FIG. 7 further comprises step S507. Step S507 may be executed after or simultaneously with step S506, for example. Like reference numbers in FIG. 5 through FIG. 7 indicate like steps or procedures.

In step S507, the bias estimator (e.g., 34, 134 or 234) estimates inter-channel bias from double difference carrier phase of the third carrier signal or the fourth carrier signal and double difference pseudo range of the third carrier signal and the fourth carrier signal, wherein the estimate remains valid until a cycle slip.

"Double difference" or "double-differenced" refers to a mathematical operation that may be applied to carrier phase or pseudo range measurements. Double difference operations may be applied to floating carrier phase ambiguities or fixed carrier phase ambiguities. The double difference may be determined by subtracting two single difference measurements between a location determining receiver and a reference location-determining receiver (e.g., reference station 40 or 41) with respect to the same two satellite signal from two different satellites. The double difference operation is used to reduce or ameliorate satellite clock error and atmospheric signal propagation bias.

In an alternate embodiment, the double difference may be determined by subtracting two single difference measurements between a location determining receiver and a reference location determining receiver with respect to two satellite signals from the same satellite measured during different epochs.

In step S507 and more generally, the double difference ambiguity solutions and inter-channel bias estimates may be vulnerable to multi-path propagation and to cycle slips. A cycle slip refers to a discontinuity in the carrier-phase measurement of carrier signal caused by a loss of lock in the signal tracking within the location-determining receiver. For example, the cycle slip may comprise a complete integer cycle jump or partial cycle jump in the carrier phase ambiguity. A cycle slip may be caused by obstructions that obstruct signal propagation and reception of one or more satellite signals at the location-determining receiver. The location-determining receiver detect a loss of lock by detecting an abrupt jump or transition in the carrier phase ambiguity or from discrepancy between measured phases at the location-determining receiver and the reference receiver. In the event of a cycle slip, the real time kinematic engine 20 or the error-reduction filter 24 may reinitialize and restart the ambiguity estimation, which can result in a data gap that may be addressed with dead-reckoning data from supplemental sensors (e.g., accelerometers, odometers or otherwise) until the location-determining receiver reacquires the carrier phase ambiguity solution and/or its precise position.

The double difference phase determinations of step S507 may be executed in accordance with several techniques that may be applied individually or cumulatively.

Under a first technique, the data processor or 22 or real-time kinematic engine 20 estimates inter-channel bias associated with the third ambiguity set (e.g., third integer ambiguity set) and the fourth ambiguity set (e.g., fourth integer ambiguity set), or a precursor thereto, by calculating the double difference ambiguity set associated with a pair of third carrier signals from different secondary satellites (GLN Sat. G1 DD Ambiguity), and by calculating the double difference ambiguity set associated with a pair of fourth carrier signals from different secondary satellites (GLN Sat. G2 DD Ambiguity). The estimated double difference ambiguity sets, or the estimated precursors thereto, are then compared with a SD-based, estimated third integer ambiguity set and a SD-based, estimated fourth integer ambiguity set derived from the reference single difference measurements of carrier phase (e.g., GLONASS Reference Satellite G1 Single Difference Ambiguity and GLONASS Reference Satellite G2 Single Difference Ambiguity) to provide an estimate of inter-channel bias that is supplemented by additional inter-channel bias data. The additional inter-channel bias data includes, but is not limited to, a fixed inter-channel bias term associated with the hardware of the location-determining receiver and time-varying satellite-specific bias terms associated with specific list of GLONASS satellite frequencies received at the location-determining receiver at any given time. The satellite-specific bias terms may be referenced to a reference satellite frequency within the G1 and G2 band (e.g., central G1 or G2 frequencies) that is used for the above reference single difference determinations, for example.

Under a second technique, for GLONASS double difference determinations (e.g., carrier phase or code) the receiver clock errors or other inter-channel bias (e.g., between the location determining receiver (10, 110, 210 or 310) and the reference station (40 or 41)) may not cancel out or be trivial and may no longer be modeled or approximated as integer multiples. The clock errors (between different GLONASS satellites) do not cancel because of the different transmitting frequencies of the GLONASS satellites and the differential hardware delays peculiar to each satellite frequency. Accordingly, the GLONASS double difference determination may be supplemented with a clock bias term or another inter-channel bias term. The clock bias term may comprise additional inter-channel-bias data that may be used in conjunction with the first technique.

If the four reference satellites for GPS L1, GPS L2, GLONASS G1 and GLONASS G2 are chosen, the double-differenced observable in unit of meters (associated with the double difference pre-fit residual) can be formed as in Equation (1):

$$\lambda_j \Delta \phi_j - \lambda_k \Delta \phi_k = \nabla \Delta \rho_{k,j} + \lambda_j \cdot \Delta N_j - \lambda_k \cdot \Delta N_k + \nabla \Delta PB_{k,j} + \Delta I/f_j^2 - \Delta I/f_k^2 + \epsilon_{\nabla \Delta \phi_{k,j}}, \quad (3)$$

where $\Delta \phi_j$ is a first single-differenced carrier phase observable expressed in units of cycles, $\Delta \phi_k$ is a second single-differenced carrier phase observable expressed in units of cycles; $\lambda_j$ and $f_j$ are the wavelength and frequency, respectively, of the carrier signal associated with the first single-differenced carrier phase observable; $\lambda_k$ and $f_k$ are the wavelength and frequency, respectively, of the carrier signal associated with the second single-differenced carrier phase observable; $\Delta N_j$ is the first single-differenced integer ambiguity associated with the first single-differenced carrier phase observable; $\Delta N_k$ is the second single-differenced integer ambiguity associated with the second single-differenced carrier phase observable; $\Delta I/f_j^2$ is the single-differenced ionospheric delay for the first single-differenced carrier phase observable, $\Delta I/f_k^2$ is the single-differenced ionospheric delay for the second single-differenced carrier phase observable, where I is a function of the Total Electron Content; and $\epsilon_{\Delta\phi_{kj}}$ is the carrier phase observation noise; $\Delta\rho_{k,j}$ is the single-differenced geometry distance; and $\Delta PB_{k,j}$ is the inter-channel bias for single-differenced (SD) carrier phase measurements, and k represents the GPS L1 or L2 or the GLONASS G1 or G2 frequency. In above Equation 3, the four receiver clock terms and inter-system biases can be removed, except for the GLONASS inter-channel biases (e.g., GLONASS clock biases between different satellites).

The integer ambiguity terms can also be re-arranged in the following way to yield Equation 4 as follows:

$$\lambda_j \Delta\phi_j - \lambda_k \Delta\phi_k = \nabla\Delta\rho_{k,j} + \lambda_j \cdot \nabla\Delta N_{k,j} + (\lambda_j - \lambda_k) \cdot \Delta N_k + \nabla\Delta PB_{k,j} + \Delta I/f_j^2 - \Delta I/f_k^2 + \epsilon_{\nabla\Delta\phi_{k,j}} \quad (4)$$

For GPS carrier phase measurements, the fourth term ($\nabla\Delta PB_{k,j}$) on the right hand side of equation (4) will disappear because the inter-channel phase bias is the same for different GPS satellites. For GLONASS carrier phase measurements, the third term is called the single-differenced integer ambiguity for the reference satellite (or $(\lambda_j - \lambda_k) \cdot \Delta N_k$) and can be estimated. If the single differenced GLONASS reference satellite ambiguity for carrier phase is estimated from the GLONASS pseudo range bias for the same GLONASS satellite, the remaining errors (e.g., satellite reference error or other inter-channel bias) associated with the third term could still cause systematic model errors and might result in an incorrect double-differenced ambiguity resolution, and hence degraded positioning accuracy. It should be noted that the maximum wavelength difference is 0.85 mm for the GLONASS G1 frequency and 1.10 mm for the GLONASS G2 frequency. It is impossible to fix $\Delta N_k$ to an integer because its co-efficient is so small. For the same reason, the error on $\Delta N_k$ will have little effect on the system accuracy. For example, 1 cycle on $\Delta N_k$ will introduce less 1.1 mm of error in the measurement of the right-hand side of equation (4). The $\Delta N_k$ term is constant until a cycle slip occurs in the location-determining receiver with respect to the reference satellite. Therefore, it desirable to model $\Delta N_k$ term as one or more satellite-specific bias terms (e.g., G1 satellite bias term and a G2 satellite bias term for each GLONASS satellite received) in the error-reduction filter 24 (e.g., Kalman filter) to address inter-channel bias in the double difference processing.

In accordance with third technique for executing step S507, the data processor 22, RTK engine 20, or bias estimator 34 estimates the single difference reference satellite GLONASS ambiguity and the double difference GLONASS ambiguity (or the single difference GLONASS ambiguity), along with motion data (e.g., position data and/or velocity data) ionosphere, troposphere and ambiguity parameters together in both the double difference carrier phase and pseudo-range observation equations in Equations (3) or (4) to determine inter-channel bias.

Under a fourth technique, the data processor 22 or RTK engine 20 estimates two additional ambiguity states, which may be referred to as band specific ambiguity states for the GLONASS reference satellites at the G1 and G2 bands. The band specific ambiguity states apply all frequencies or sub-bands within each band. The band specific ambiguity states remain constant until a cycle slip in the location-determining receiver (10, 110, 210 or 310) occurs with respect to a reference satellite. It is desirable to model these reference satellite bias terms as a constant or random walk in the error-reduction filter 24 (e.g., Kalman filter). The band specific ambiguity states are not fixed as an integer and their coefficients are generally small compared to integer solutions for corresponding carrier phase ambiguities.

For determining the band specific ambiguity states, the measurements to be used are double difference carrier phase in Equation (3) or (4) and double difference pseudo-range. If the following GLONASS inter-channel bias table does not exist, they will be assumed as zero and be calibrated in real-time.

The states of the error-reduction filter 24 (e.g., predictive filter or Kalman filter) are described in the following table:

| State in Predictive or Kalman Filter | Dimension |
|---|---|
| Position XYZ | 3 |
| Velocity XYZ | 3 |
| Acceleration XYZ | 3 |
| Residual troposphere | 1 |
| GPS Residual DD ionosphere | NGPS-1 |
| GPS L1 DD ambiguity | NGPS-1 |
| GPS L2 DD ambiguity | NGPS-1 |
| GLN Residual DD ionosphere | NGLN-1 |
| GLN G1 DD ambiguity | NGLN-1 |
| GLN Reference Sat G1 SD ambiguity | 1 |
| GLN G2 DD ambiguity | NGLN-1 |
| GLN Reference Sat G2 SD ambiguity | 1 | where
  NGPS is number of GPS satellites used.
  NGLN is number of GLONASS satellites used.
The remaining single difference ambiguities for the reference GLONASS satellite will have less impact on double difference ambiguity and positioning accuracy when multiple epoch data are processed and they could be considered as the same unknown parameter for different epochs. Some special care is required for GLONASS reference satellite ambiguity states in the error-reduction filter 24 (e.g., Kalman filter), especially for the GLONASS code and phase inter-channel bias calibration procedure as later described in more detail.

Under a fifth technique for carrying out step S507, an alternative approach is to form the double-differenced observable after the single-differenced observables are expressed in units of cycles:

$$\nabla\Delta\phi_{k,j} = \left(\frac{1}{\lambda_j}\Delta\rho_j - \frac{1}{\lambda_k}\Delta\rho_k\right) + \\ (f_j - f_k) \cdot \Delta dT(Freq)_{p,q}^{j,k} + \nabla\Delta N_{k,j} - (\Delta I/(\epsilon f_j) - \Delta I/(\epsilon f_k)) + \\ \left(\frac{1}{\lambda_j}\Delta d_j^{trop} - \frac{1}{\lambda_k}\Delta d_k^{trop}\right) + \left(\frac{1}{\lambda_j}\Delta PB_j - \frac{1}{\lambda_k}\Delta PB_k\right) + \varepsilon_{\nabla\Delta\phi} \quad (5)$$

where $\Delta dT_k$ refers to $\Delta T_{GPSL1}$, $\Delta T_{GPSL2}$, $\Delta T_{GLNG1}$, and $\Delta T_{GLNG2}$ respectively for the GPS L1, GPS L2, GLONASS G1 and GLONASS G2 signals. It can be seen that the differenced receiver clock bias cannot be eliminated in Equation (5). The fourth term (ionospheric delay) and the fifth term (tropospheric delay) become slightly larger than in the case when the two frequencies are the same. Using GPS and GLONASS pseudo-range measurements, the difference between the two receiver clock biases can be estimated. This could be used to correct the second term for ambiguity resolution purposes. However, this receiver clock bias may significantly degrade the positioning accuracy and ambiguity resolution. Because of the different frequencies for the different GLONASS satellites, the relative receiver clock bias ΔdT and inter-channel biases cannot be cancelled in the GLONASS double-differenced carrier phase Equation (5).

Under a sixth technique for carrying out step S507, the data processor 22, the RTK engine 20 or the bias estimator (34, 134, 234) estimates a relative clock parameter (the second term on the right side of later described Equation (5), which could be estimated using single differential pseudo-range measurements, into the GLONASS double-differenced carrier phase observation of Equation (5). It should be mentioned that the two relative clocks estimated using GLONASS P1/C1 and P2/C2 codes should be estimated separately. However for ambiguity resolution purposes and high accuracy positioning applications, the remaining clock bias cannot be ignored. Furthermore, this term could not be considered as the same unknown parameter for different epochs.

The frequency difference between GLONASS signals will be smaller than 7.3125 MHz for G1 observations and 5.6875 MHz for G2 observations. If a 1 meter clock bias exists, its worst impact on the carrier phase will be 0.0244 cycles for L1 and 0.019 cycles for L2 respectively. The difference between the two receiver clock biases can be expected to be less than 10 ns (3 meters), hence this term could be corrected at the level of 0.06-0.075 cycles. However, for ambiguity resolution purposes and high accuracy positioning applications, the remaining bias can't be ignored. Furthermore, this term cannot be considered as the same unknown parameter for different epochs.

If a common reference satellite is chosen for GPS L1/L2 and GLONASS G1/G2 (for example, a GPS L1 satellite), we can examine the impact of the receiver clock bias. The maximum frequency differences between GPS L1 and GLONASS G1, GPS L2, and GLONASS G2 are 30.52 MHz, 347.82 MHz and 326.36 MHz respectively. If we assume that the clock biases are estimated within one meter, the second term could be corrected at the level of the 0.10, 1.16, and 1.09 cycles for the GLONASS G1, GPS L2, GLONASS G2 measurements respectively. In practice, separate reference satellite measurements for GPS L1/L2 GLONASS G1/G2 are used, rather than the common GPS L1 reference satellite.

Figure 8:
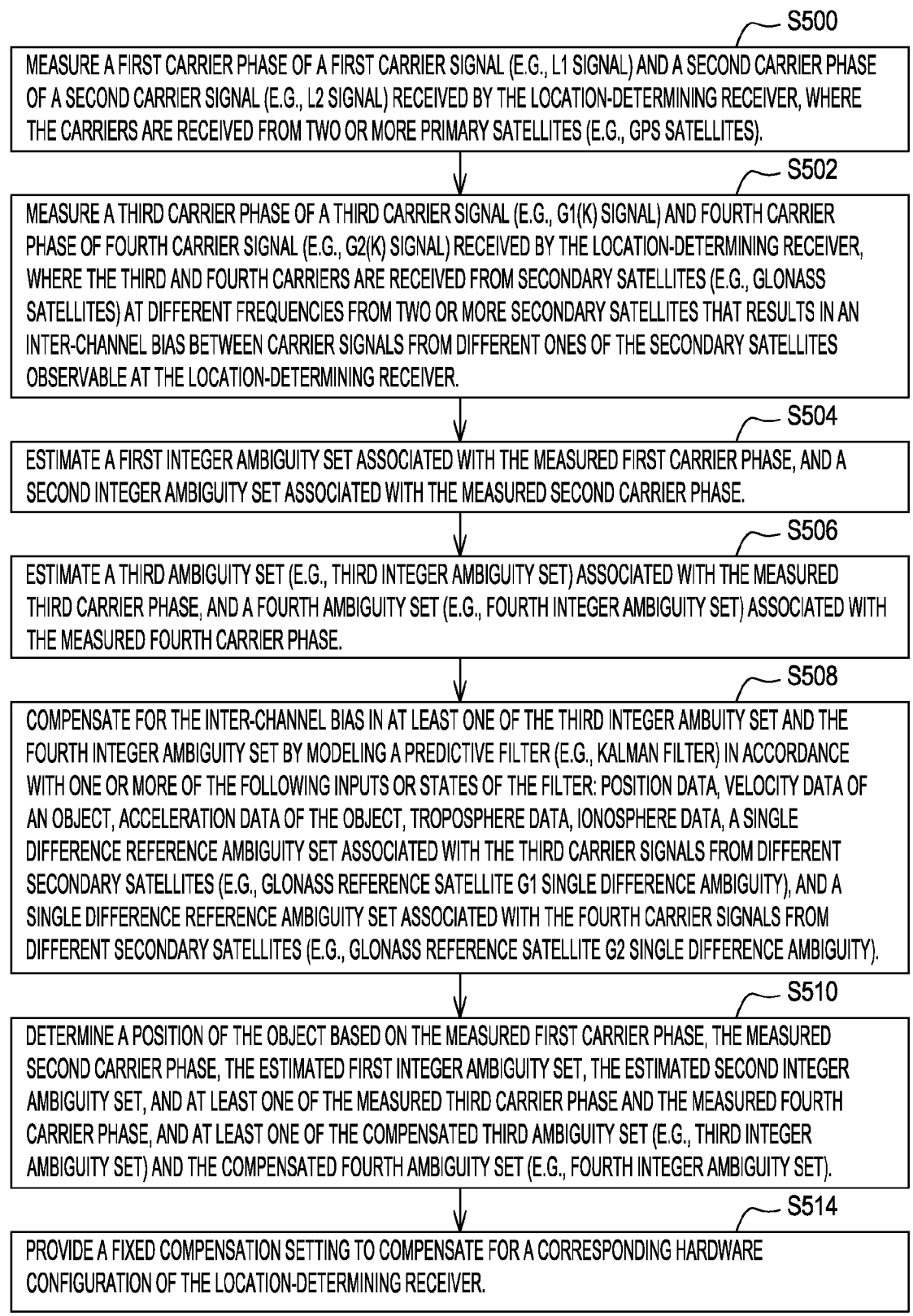
FIG. 8 is a flow chart of a fourth example of a method for estimating position with bias compensation.

The method of FIG. 8 is similar to the method of FIG. 5, except the method of FIG. 8 further comprises step S514. Step S514 may be executed before, after or simultaneously with step S510, for example. Like reference numbers in FIG. 5 and FIG. 8 indicate like steps or procedures.

In step S514, the bias compensator 32 provides a fixed compensation setting for a corresponding hardware configuration of the location-determining receiver (e.g., 10, 110, 210 or 310). A location determining receiver (e.g., 10, 110, 210 or 310) and the reference station (40 or 41), may contain receiver circuitry (e.g., microwave filters or amplifiers) that differs or may not respond with uniform delay over an entire bandwidth of the GLONASS L1 and L2 signals, for instance. Sometimes the receiver circuitry uses different reference clocks for the GPS and the GLONASS receiver circuitry, which can be accounted for by proper processing. To minimize the receiver biases between different designs or manufacturers, the location-determining receivers may include hard-coded bias corrections, which are determined in the process of calibrating a given type of location-determining receiver using a simulator or a zero-baseline approach. Another method that allows reducing the hardware biases is a proper choice of hardware components. All the mentioned methods lead to significant removal of hardware biases in GNSS receivers. It is also important to estimate biases such as GPSL1-GPS L2, GPSL1-GLNG1 and GPSL1-GLNG2 at a pre-release stage.

The method of FIG. 9 is similar to the method of FIG. 5, except the method of FIG. 9 further includes step S516 and step S518. Like reference numbers in FIG. 5 and FIG. 8 indicate like steps or procedures.

In step S516, the bias estimator (34, 134, or 234) of the code bias controller 52 estimates a pseudo-code bias between a secondary pseudo-code (e.g., GLONASS SP code) enclosed on the third carrier signal or the fourth carrier signal and the primary pseudo-code (e.g., C/A code) encoded on the first carrier signal. All the GLONASS biases below for real-time calibration represent single differenced inter-channel bias for a given pair of receivers, i.e. SD biases, not zero difference or DD biases. All GLONASS inter-channel code biases are referenced to GPS. For any particular GLONASS satellite, three different code biases could exist: (1) CA code bias (bias of a GLONASS CA code with respect to all GPS CA codes), (2) P1 code bias (bias of a GLONASS P1 code with respect to all GPS P1 codes), and (3) P2 code bias (bias of a GLONASS P2 code with respect to all GPS P2 codes). The above distinction between CA code bias and P1 code bias is very important, especially for L1 band, where we may optionally use either CA or P1 codes.

As GLONASS pseudo ranging code measurements are not generally as accurate as the pseudo noise code measurements of GPS, the GLONASS code biases may be estimated outside of the error-reduction filter 24 (e.g., Kalman Filter). In particular, the bias estimator (34, 134, 234) estimates code bias outside the error-reduction filter 24 (e.g., Kalman filter) using single-differenced GLONASS code post-fit residuals.

Each location determining receiver (10, 110, 210 or 310) may maintain in the data storage device 28, or elsewhere, a table of code bias information (bias table) including one o more of the following: (1) Base station ID (if possible); (2) Code type (CA (e.g., GPS course acquisition), SP (e.g., GLONASS standard precision code), G1C (e.g., GLONASS CA code), C2C (e.g., GLONASS CA code), (P1 (e.g., GPS precise code component), or P2 (e.g., GPS precise code component)); (3) Time tag (GPS time+week number) for each GLONASS satellite; (4) Bias value estimate (CB) for each GLONASS satellite; and (5) Bias error variance estimate (VAR) for each GLONASS satellite. The time tag and base station ID are useful to save bias table information in the data storage device 28 (e.g., non-volatile RAM) in order to use it for the next RTK session. Note that generally it is possible to keep up to NSITE×BLOCK×NSAT bias tables, where NSITE is the number of possible base stations and BLOCK<=3 is the number of measurement such as CA, P1, and P2. NSAT is number of GLONASS satellites.

In step S518, the bias estimator (34, 134, or 234) of the code bias controller 52 stores the estimate pseudo-code bias in a data storage device 28 (e.g., nonvolatile electronic memory or random access memory) as part of a bias table that is accessible at least to the real time kinematic engine 20.

Figure 10:
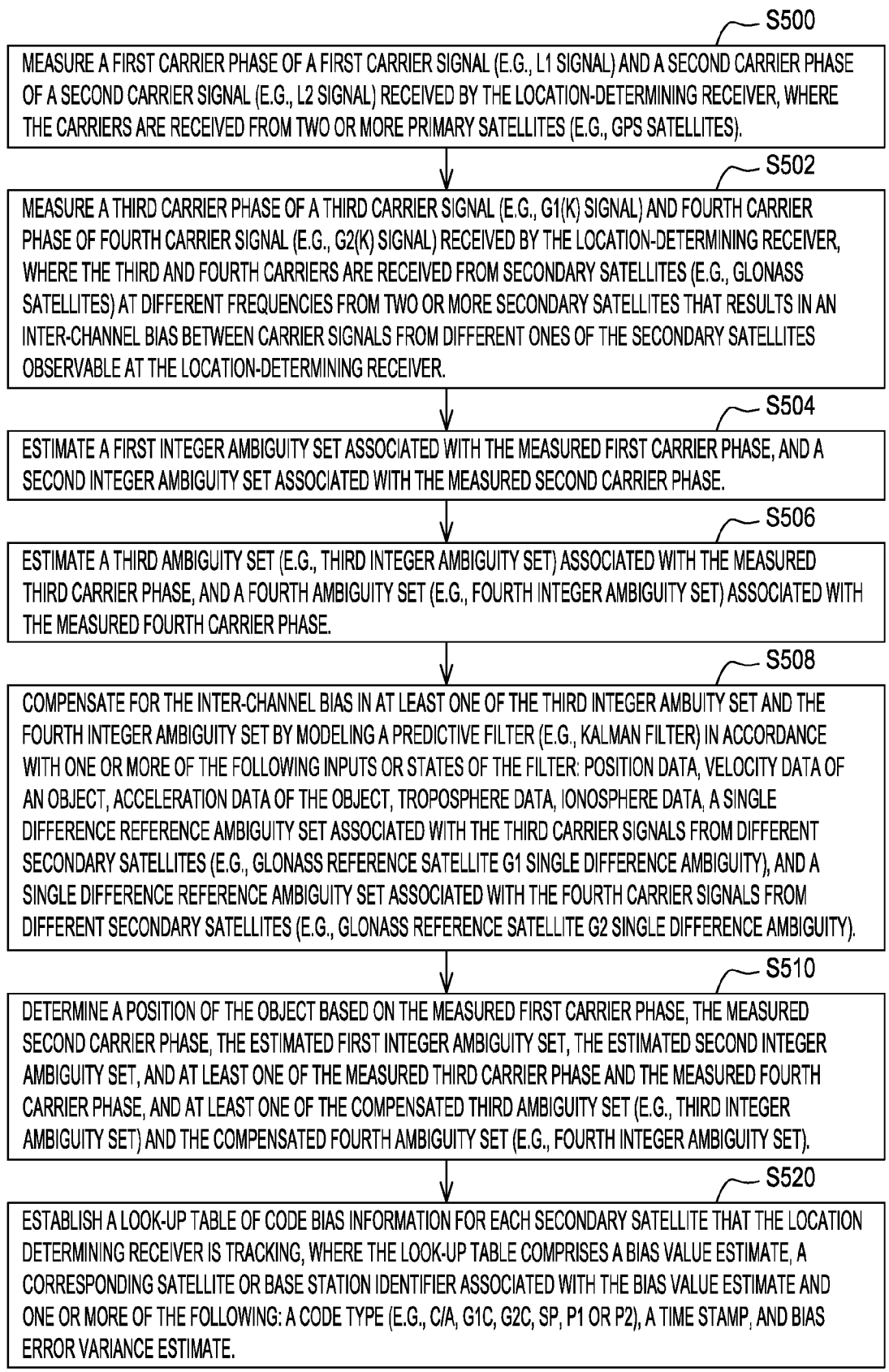
FIG. 10 is a flow chart of a sixth example of a method for estimating position with bias compensation.

The method of FIG. 10 is similar to the method of FIG. 5, except the method of FIG. 10 further comprises step S520. Step S520 may be executed before, after or simultaneously with step S510, for example. Like reference numbers in FIG. 5 and FIG. 10 indicate like steps or procedures.

In step S520, the bias estimator (34, 134, or 234) or the code bias controller 52, establishes a look-up table of code bias information for each secondary satellite that the location-determining receiver is tracking, where the look-up table comprises a bias value estimate, a corresponding satellite or base station identifier associated with the bias value estimate and one or more of the following: a code type (e.g., C/A, SP, P1, or P2) a time stamp, and bias error variance estimate.

Step S520 may support a bias initialization procedure and a Random walk model. For example, in GLONASS bias processing, the bias estimator (34, 134 or 234) or the location-determining receiver may use a Random Walk model that is independent from satellite to satellite, block to block, and base to base. This model is described by parameter $Q_{CB}$ which describes the maximally expected code bias drift (e.g., the default may be set to approximately $1e^{-8}$ or another suitable exponential value).

In general, GLONASS bias processing consists of 5 operations that may be facilitated by the methods of FIG. 10 through FIG. 16, alone or in combination with each other: (1) Bias initialization, (2) Time Update (apply bias model), (3) Bias compensation (apply bias information), (4) Bias calibration (update bias information), and (5) Bias quality control and bias table update.

Figure 11:
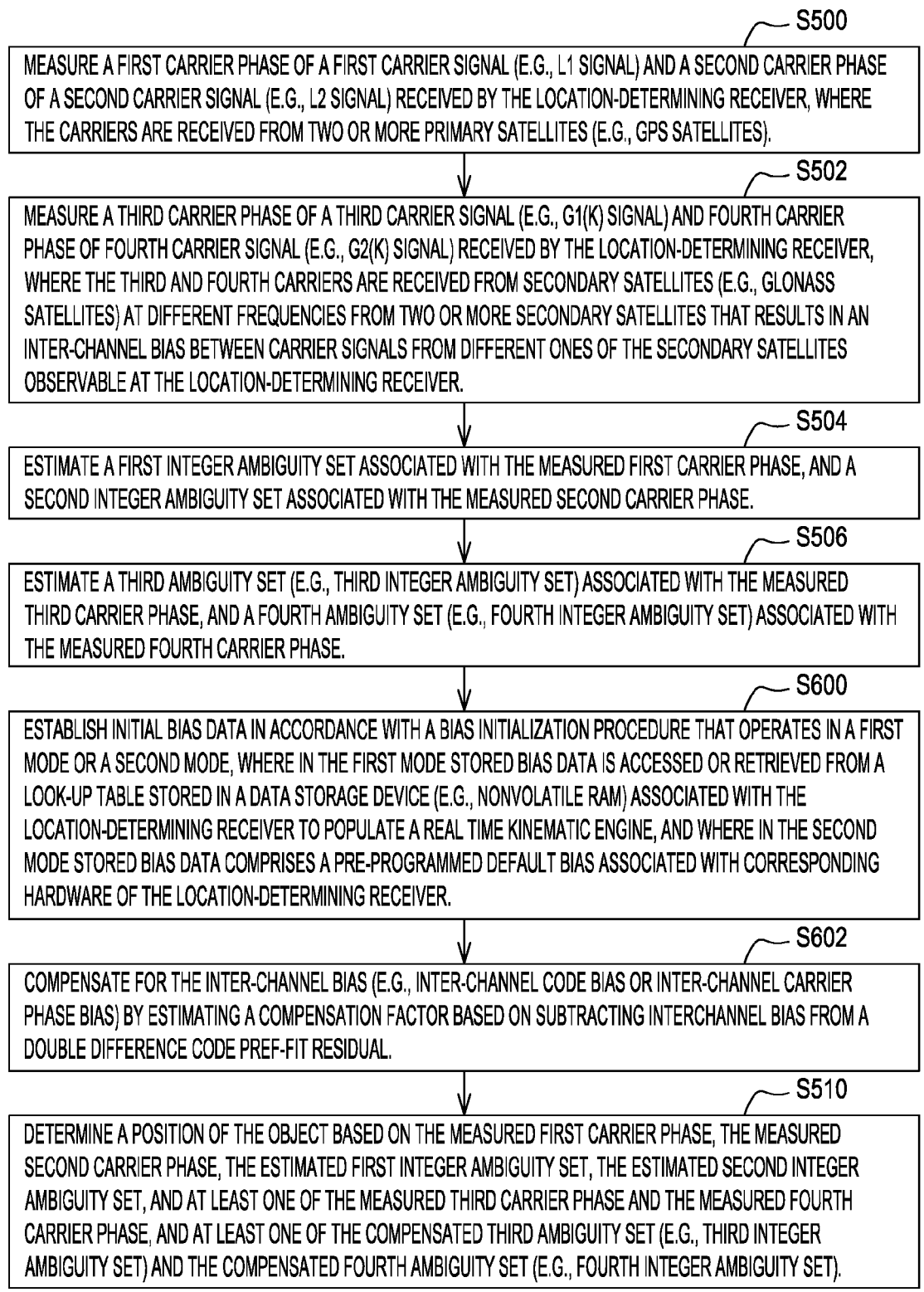
FIG. 11 is a flow chart of a seventh example of a method for estimating position with bias compensation.

FIG. 11 discloses a flow chart in accordance with a first example of estimating position, attitude, or both of an object or vehicle with bias compensation to support combined use of Global Positioning System (GPS) satellite transmissions and GLONASS (Global Navigation Satellite System) satellite transmissions. The method of FIG. 11 begins in step S500.

In step S500, a primary receiver data processing system 14 or the primary phase measurement device 18 measures a first carrier phase (e.g., L1 GPS signal) and a second carrier phase (e.g., L2 GPS signal) received by the location determining receiver (10, 110, 210 or 310), where the carriers are received from two or more primary satellites (e.g., GPS satellites).

In step S502, a secondary receiver data processing system 16 or the secondary phase measurement device 30 measures a third carrier phase of a third carrier signal (e.g., G1(K) or GLONASS L1 sub-band signal) and a fourth carrier phase of a fourth carrier signal (e.g., G2(K) or GLONASS L2 sub-band signal) received by the location-determining receiver (10, 110, 210 or 310), where the third and fourth carriers are received from secondary satellites (e.g., GLONASS satellites) at different frequencies from two or more secondary satellites that result in an inner-channel bias between carrier signals from different ones of the secondary satellites observable at the location-determining receiver (10, 110, 210 or 310).

In step S504, the data processor 22 or the real time kinematic engine 20 estimates a first integer ambiguity set associated with the measured first carrier phase, and a second integer ambiguity set associated with the measured second carrier phase. For example, in one embodiment the data processor or the RTK engine 20 may estimate the first integer ambiguity set and the second integer ambiguity set, if the signal quality of the GPS carrier signals received at the location-determining receiver (e.g., 10, 110, 210 or 310) is greater than a threshold signal quality level (e.g., determined at the primary receiver front end 12, the primary decoder 48, or the primary phase measurement device 18) for at least a minimum number of satellites in the GPS constellation.

In step S506, the data processor 22 or the real time kinematic engine 20 estimates a third integer ambiguity set associated with the measured third carrier phase, and a fourth integer ambiguity set associated with the measured fourth carrier phase. For example, in one embodiment the data processor or the RTK engine 20 may estimate the third integer ambiguity set and the third integer ambiguity set, if the signal quality of the GLONASS carrier signals received at the location-determining receiver (10, 110, 210 or 310) is greater than a threshold signal quality level (e.g., determined at the secondary receiver front end 13, the secondary decoder 50, or the secondary phase measurement device 30) for at least a minimum number of satellites in the GLONASS constellation.

In step S600, a bias estimator (34, 134 or 234) establishes initial bias data in accordance with a bias initialization procedure that operates in a first mode or a second mode, where in the first mode stored bias data is accessed or retrieved from a look-up table stored in a data storage device 28 (e.g., nonvolatile electronic memory) associated with the location-determining receiver (10, 110, 210 or 310) to populate the real time kinematic engine 20, and where in the second mode stored bias data comprises a pre-programmed default bias associated with corresponding hardware of the location-determining receiver 600.

In another example for carrying out step S600, bias information is initialized with RTK start up. It may be either coarse initialization when there is no a priori information about biases available or normal initialization when there is some a priori information about biases which can be loaded from the bias table in NVRAM.

If a priori bias information is available then initial values are as follows:

$$\Delta CB_{block}(svld) = \text{NVRAM\_BIAS}$$

$$\text{VAR}_{block}(svld) = (\text{NVRAM\_VAR})^2 \quad (6)$$

where NVRAM_BIAS and NVRAM_VAR are GLONASS code bias and variance information stored in the NVRAM table; $\Delta CB_{block}(svld)$ and $\text{VAR}_{block}(svld)$ are GLONASS code bias; and variance for a given satellite (svld). It is important to ensure that the station ID in the bias table match that in use if the bias table information is used. If the IDs are not available or don't match, a default hard-coded bias or a zero bias should be used, along with a default variance of 25 m$^2$. Note also that the biases will be smaller if the receivers are of the same type and manufacturer. With default initialization, the time update for the very first epoch should not be performed.

In step S602, a bias estimator (34, 134 or 234) or bias compensator 32 compensates for the inter-channel bias (e.g., inter-channel code bias, inter-channel carrier phase bias, or both between GLONASS sub-channels in the GLONASS L1 band or L2 band) by estimating a compensation factor based on subtracting inter-channel bias from a double difference code pre-fit residual. Once the GLONASS inter-channel code bias calibration process is running in real-time, the inter-channel bias in Equation (3) can be simply subtracted from the corresponding DD code pre-fit residual and the variance of this difference can be adjusted by $\text{VAR}_{block}$ (svld) in the measurement covariance matrix R.

In step S510, the primary receiver data processing system 14 or the estimator 26 determines a position of the object based on the measured first carrier phase, the measured second carrier phase, the estimated first integer ambiguity set, the estimated second integer ambiguity set, and at least one of the measured third carrier phase and the measured fourth carrier phase, and at least one of the compensated third integer ambiguity set and the compensated fourth integer ambiguity set.

Figure 12:
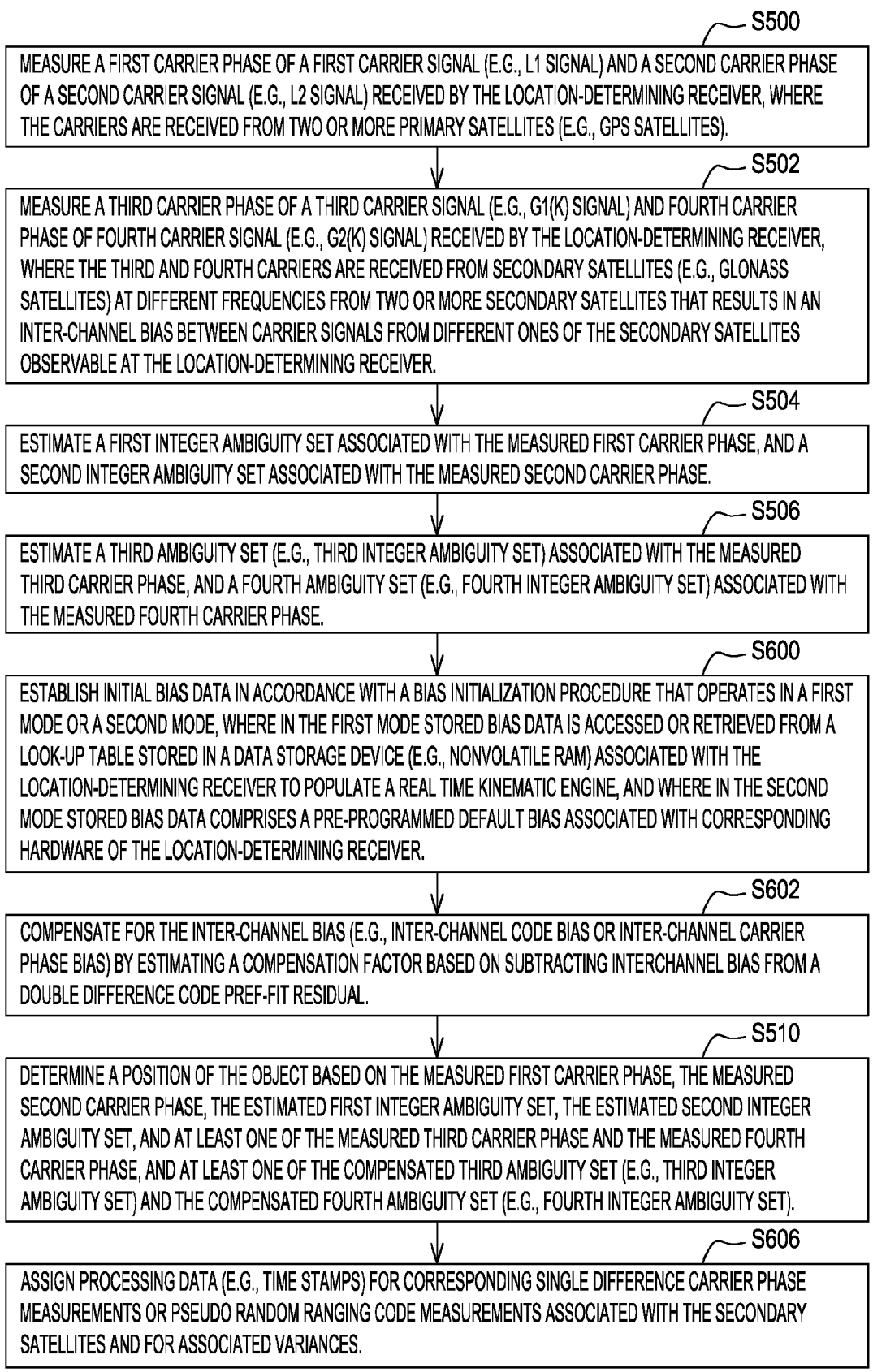
FIG. 12 is a flow chart of an eighth example of a method for estimating position with bias compensation.

The method of FIG. 12 is similar to the method of FIG. 11, except the method of FIG. 12 further comprises step S606. Like reference numbers in FIG. 11 and FIG. 12 indicate like steps or procedures. Step S606 may be executed before, after or simultaneously with step S510.

In step S606, the data processor 22 or bias estimator (34, 134 or 234) assigns time stamps for corresponding single difference carrier phase measurements or pseudo random ranging code measurements associated with the secondary satellites and for associated variances.

Figure 13:
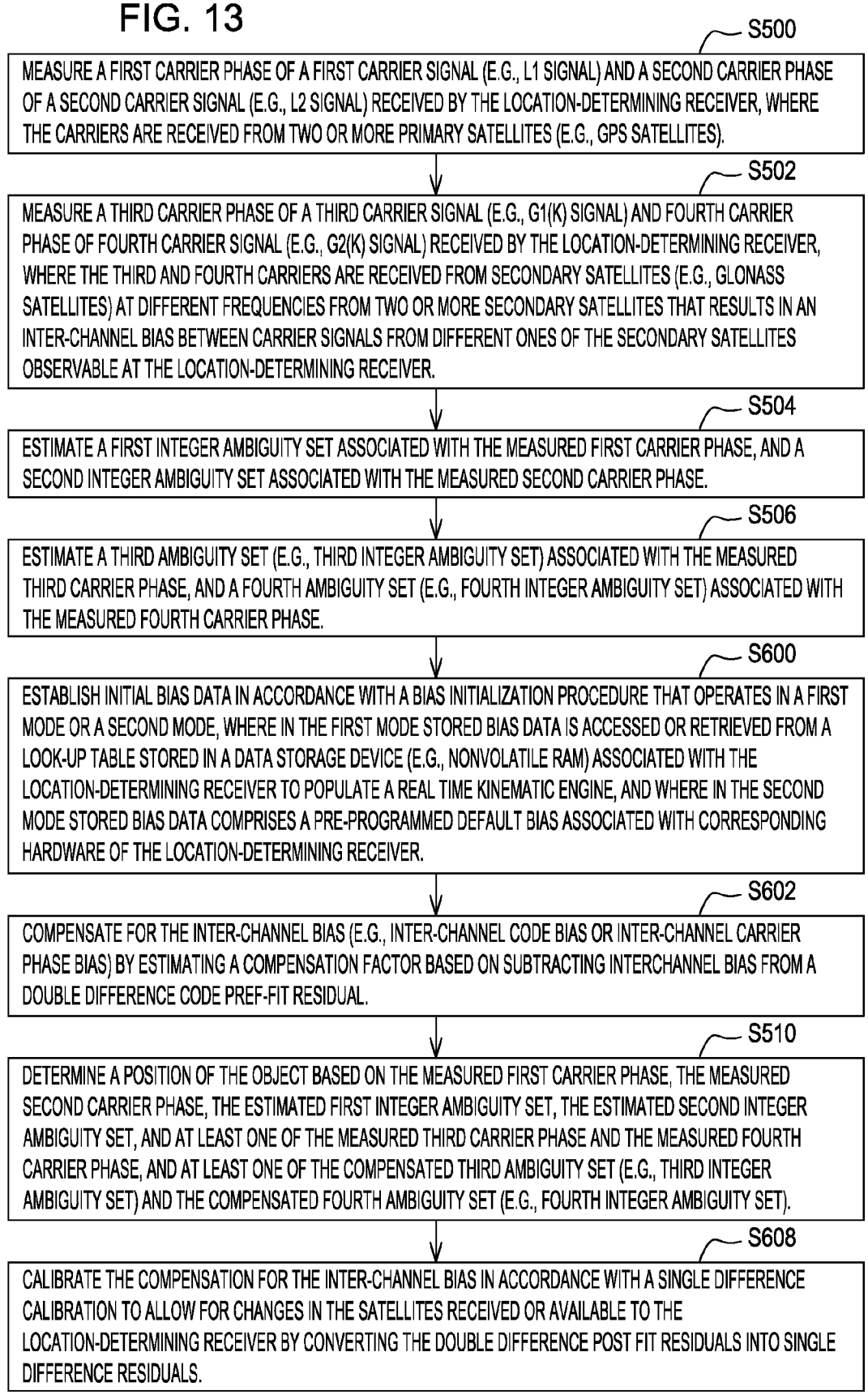
FIG. 13 is a flow chart of a ninth example of a method for estimating position with bias compensation.

The method of FIG. 13 is similar to the method of FIG. 11, except the method of FIG. 13 further comprises step S608. Like reference numbers in FIG. 11 and FIG. 13 indicate like steps or procedures. Step S608 may be executed before, after, or simultaneously with step S510.

In step S608, a calibrator 64 or a bias estimator 234 calibrates the compensation for the inter-channel bias in accordance with a single difference calibration to allow for changes in the satellites received or available to the location-determining receiver (10, 110, 210 or 310) by converting the double difference post fit residuals into single difference residuals.

Having processed all epoch data we can obtain the SD code post-fit residual vector RES for each code block (i.e., CA, P1, and P2) with its associated measurement covariance R used in the measurement covariance update. Each CA/P1/P2 block is processed independently and similarly. As mentioned earlier, the proposed RTK algorithm is a DD based approach. However, it may be desirable to use a single differenced GLONASS inter-channel bias calibration in order to make it easier to deal with a reference satellite change. The basic idea is to convert the original DD post-fit residuals into single difference post-fit residuals if the DD approach is used. First, we store the pre-fit SD GPS/GLONASS code residuals Z and design matrix H which is computed by using the projected location-determining receiver coordinates (e.g., RTK rover coordinates). The SD receiver clock is contained inside the SD pre-fit residuals. After the RTK batch updates (CA/P1/L1/P2/L2), the error-reduction filter 24 (e.g., Kalman filter) state corrections are accumulated in the $\delta X$ variables of filter states, which can be used to compute the post-fit SD residuals GPS_RES for GPS and GLN_RES for GLONASS are as shown in the following equations:

$$\text{GPS\_RES} = Z - H\delta X \tag{8}$$

$$\text{GLN\_RES} = Z - H\delta X - \text{weight\_mean(GPS\_RES)} \tag{9}$$

The term weight_mean(GPS_RES) means taking a weighted (using vector R) mean value from the GPS block over all block residuals (CA/P1/P2 respectively) of the SD GPS receiver clock. It should be noted that the $\delta X$ includes the three coordinate updates, and may include some remaining ionospheric and tropospheric contributions in long range cases.

GLN_RES contains GLONASS inter-channel biases relative to the GPS associated variance R, where R is the covariance used in the GLONASS code update for a given satellite. The bias update routine can be described in Equations (10-13):

$$K = \frac{VAR_{block}(svId)}{VAR_{block}(svId) + R} \tag{10}$$

$$VAR_{block}(svId) = VAR_{block}(svId)(1 - K) \tag{11}$$

$$\Delta CB_{block}(svId) = \Delta CB_{block}(svId) + K \cdot \text{GLN\_RES}(svId) \tag{12}$$

where K is the gain for the GLONASS code bias.

Figure 14:
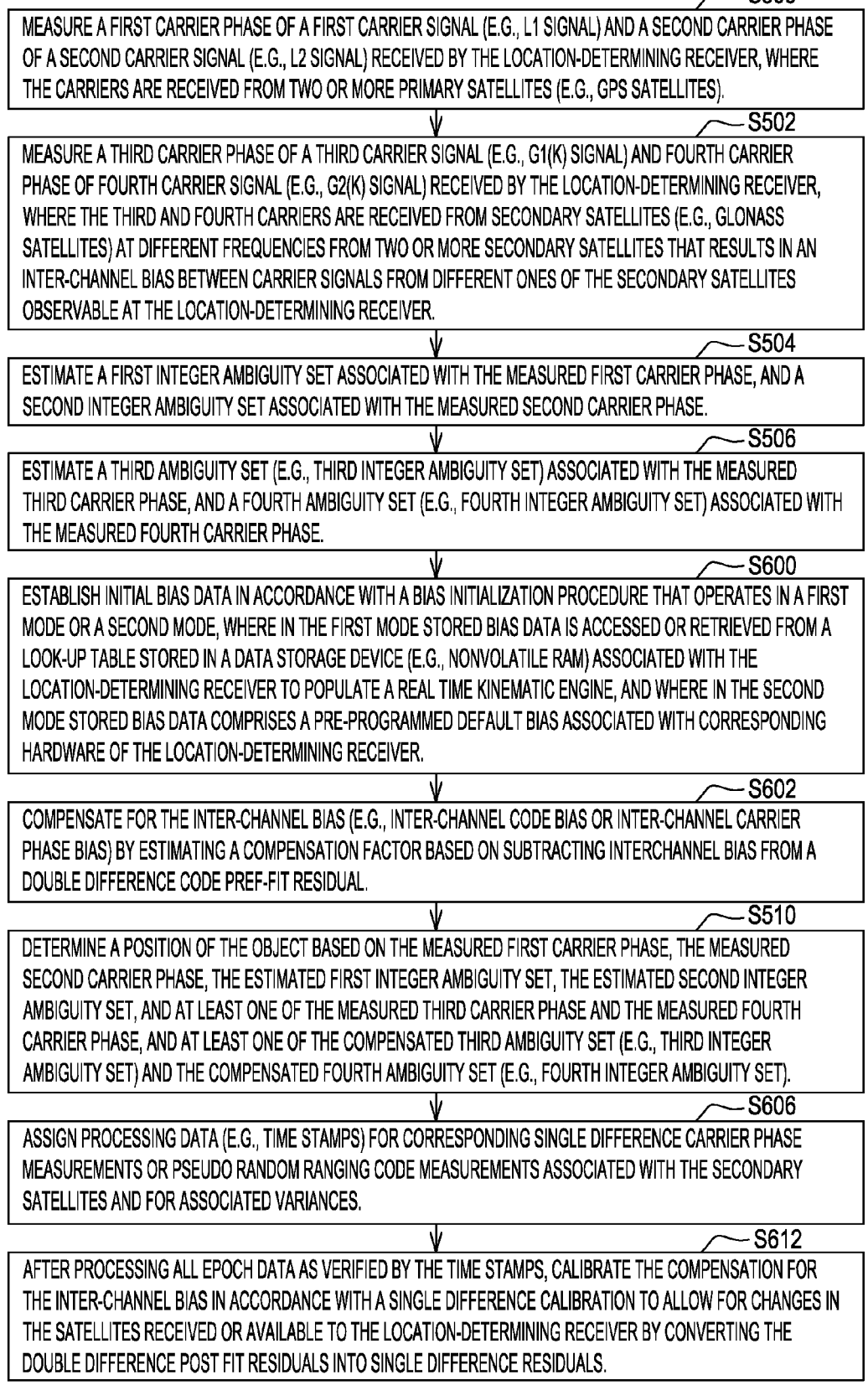
FIG. 14 is a flow chart of a tenth example of a method for estimating position with bias compensation.

The method of FIG. 14 is similar to the method of FIG. 11, except the method of FIG. 12 further comprises step S606. Like reference numbers in FIG. 11 and FIG. 14 indicate like steps or procedures. Step S606 may be executed before, after or simultaneously with step S510.

In step S606, the data processor 22 or bias estimator (34, 134 or 234) assigns time stamps for corresponding single difference carrier phase measurements or pseudo random ranging code measurements associated with the secondary satellites and for associated variances. For example, for a GLONASS SD code measurement at time T(now), it is assumed the a GLONASS bias estimate $\Delta CB_{block}$(svld) with associated variance $VAR_{block}$(svld) tagged to time T(pre) is available. The GLONASS bias time update from time T(pre) to T(now) can be done if $\Delta CB_{block}$ (svld) is left unchanged, but its variance $VAR_{block}$(svld) is projected as shown in Equation (7) as follows:

$$VAR_{block}(svld) = VAR_{block}(svld) + (T(\text{now}) - T(\text{pre})) \cdot Q_{CB}, \tag{7}$$

where $Q_{CB}$ is defined by constant values. After the Equation (7) variance update is performed, the GLONASS bias $\Delta CB_{block}$(svld) and variance are tagged to time T(now).

In step S612, after processing all epoch data as verified by the time stamps, the data processor 22, bias estimator 234, or calibrator 64 calibrate the compensation for the inter-channel bias in accordance with a single difference calibration to allow for changes in the satellites received or available to the location-determining receiver (10, 110, 210, 310) by converting the double difference post fit residuals into single difference residuals.

Figure 15:
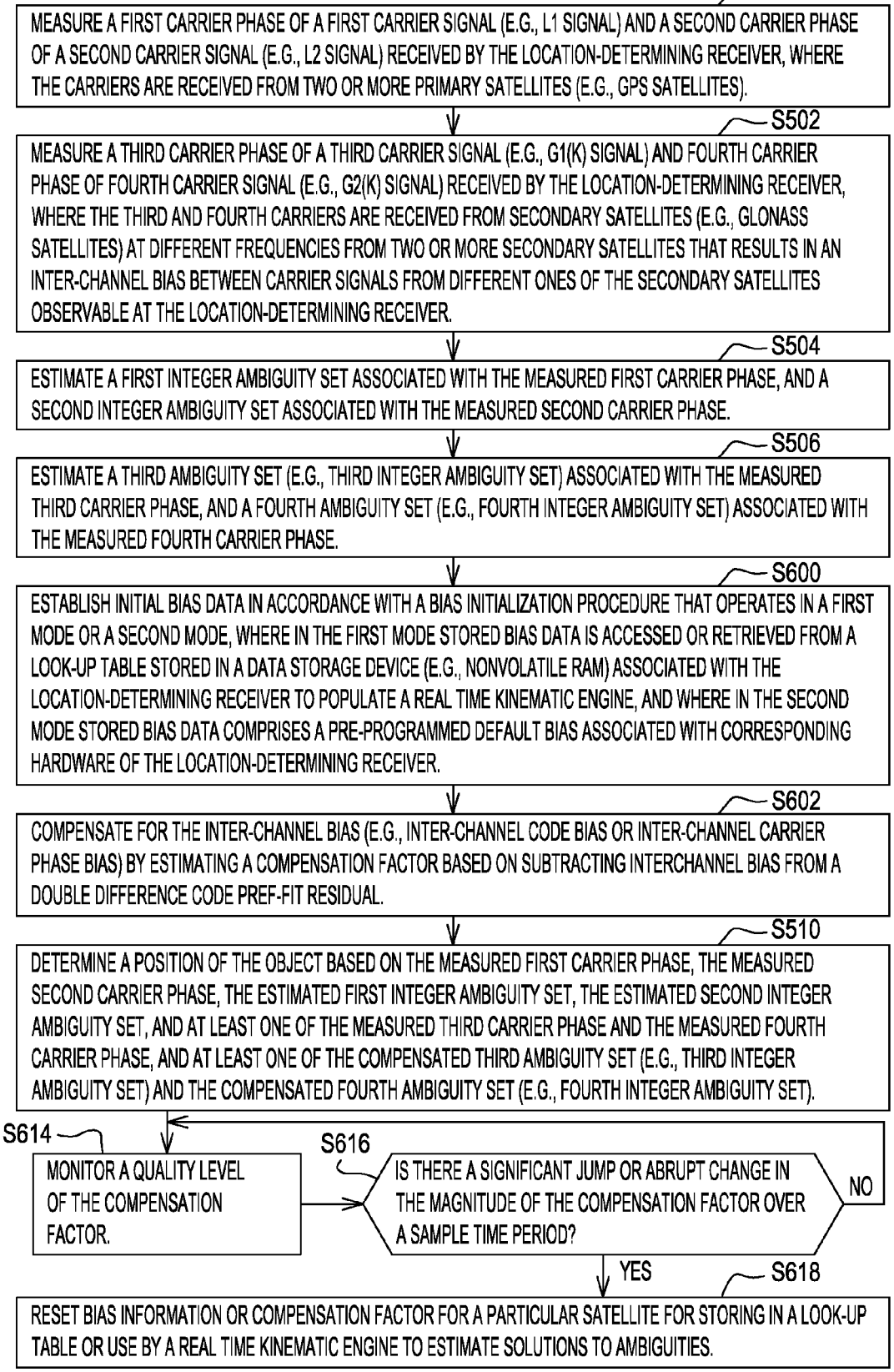
FIG. 15 is a flow chart of an eleventh example of a method for estimating position with bias compensation.

The method of FIG. 15 is similar to the method of FIG. 11, except the method of FIG. 15 further comprises step S614, step S616, and step S618. Like reference numbers in FIG. 11 and FIG. 15 indicate like steps or procedures. Step S614 may be executed before, after or simultaneously with step S510.

In step S614, a bias estimator 234 or quality evaluator 68 monitors a quality level of the compensation factor.

All the bias information can be reset either by user command or quality control check in the software. For example, a reset may be needed in cases such as base station identifier (ID) change or a significant jump in a GLONASS inter-channel code bias. The bias information for a particular satellite could also be reset when a given GLONASS SD code was present in input data, but has been flagged as questionable (for example, by a RAIM algorithm) and not used in the block update.

In step S616, the bias estimator 234 or the quality evaluator 68 determines if there is a significant (e.g., material) jump or abrupt change in the magnitude of the compensation factor over a sample time period. For example, in one configuration, a significant jump or abrupt change may comprise a five percent or greater change in the magnitude of the compensation factor over one or more sample periods. If there is a significant jump or abrupt change in the magnitude of the compensation factor over a sample time period, the method continues with step S618. However, if there is not a significant jump or material abrupt change in the magnitude of the compensation factor, the method returns to step S614, where the quality level of the compensation factor is monitored for the next sampling period.

Figure 16:
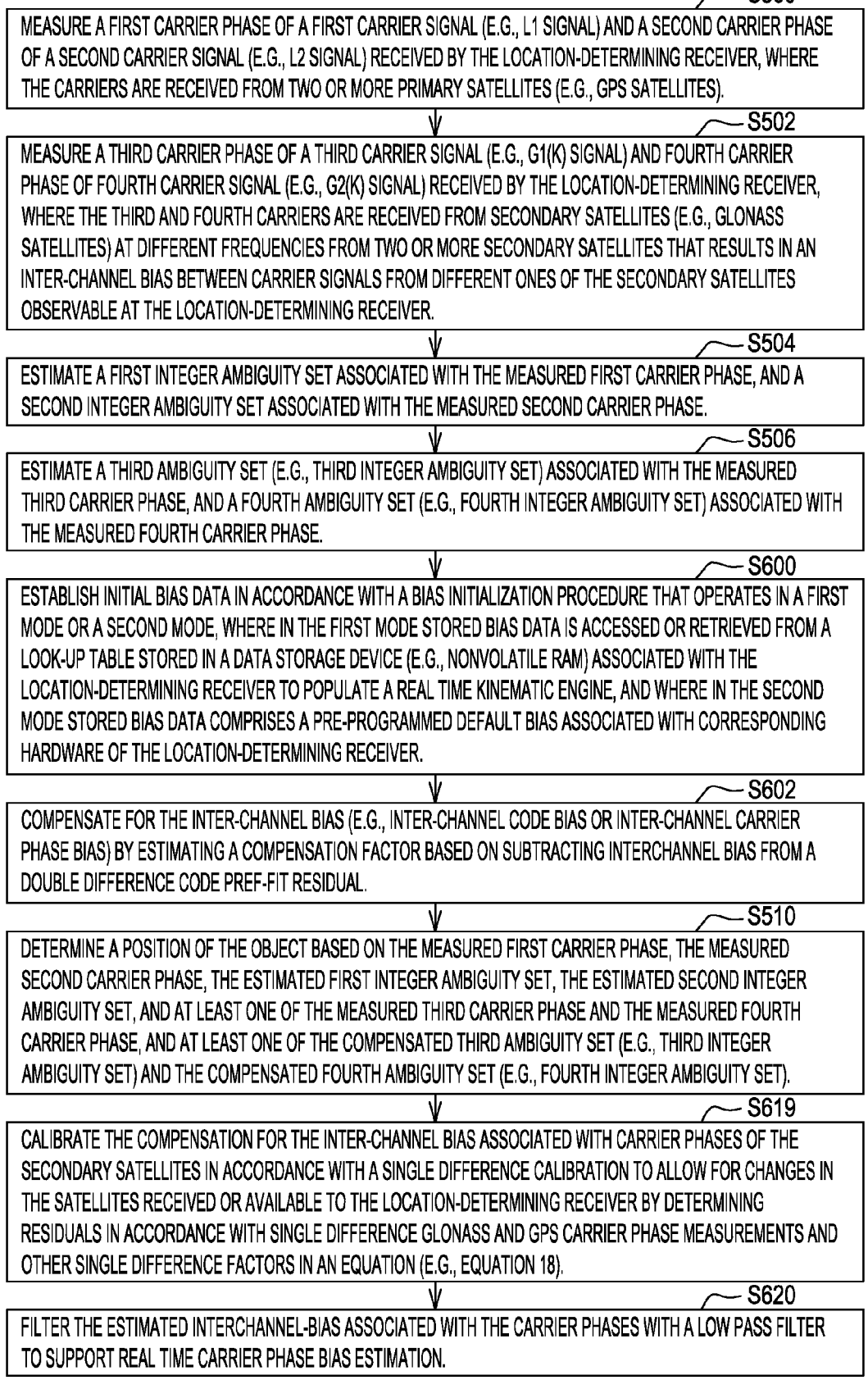
FIG. 16 is a flow chart of a twelfth example of a method for estimating position with bias compensation.

The method of FIG. 16 is similar to the method of FIG. 11, except the method of FIG. 16 further comprises step S614, step S616, and step S619. Like reference numbers in FIG. 11 and FIG. 16 indicate like steps or procedures. Step S619 may be executed before, after or simultaneously with step S510.

In step S619, the calibrator 64 or the bias estimator 234 calibrates the estimated inter-channel bias or the compensation for the inter-channel bias associated with carrier phases of the secondary satellites in accordance with a single difference calibration to allow for changes in the satellites received or available to the location-determining receiver (10, 110, 210 or 310) by determining residuals in accordance with Equation 18 or an equivalent or similar calculation that uses substantially a majority of the same variables or variables with values correlated thereto.

Unlike the estimation of the inter-channel code bias, the single difference GLONASS receiver clock needs to be precisely determined in order to estimate GLONASS inter-channel carrier phase biases. GLONASS receiver clock bias estimation needs to be sufficiently accurate or otherwise addressed as a source of possible error. Here, an innovative approach is proposed to estimate the carrier phase inter-channel bias. The single difference carrier phase measurements of GPS and GLONASS between two receivers can be written as follows:

$$\Delta\phi_k^{GPS}\lambda^{GPS} = \qquad (13)$$
$$\Delta\rho^{GPS} + c \cdot \Delta dT_{GPS} + \Delta N_k^{GPS}\lambda^{GPS} - \frac{\Delta I_k}{GPS f^2} + \Delta d_k^{trop} + \varepsilon_{\Delta\phi_k}$$

$$\Delta\phi_l^{GLN}\lambda_l^{GLN} = \Delta\rho_l^{GLN} + c \cdot \Delta dT^{GLN} + \qquad (14)$$
$$\Delta N_l^{GLN}\lambda_l^{GLN} - \frac{\Delta I_k}{GLN f_l^2} + \Delta d_l^{trop} + \Delta B_l^{GLN}\lambda_l^{GLN} + \varepsilon_{\Delta\phi_k}$$

$$\Delta dT^{GLN} = \Delta dT^{GPS} + \Delta dT_{InterSystem} \qquad (15)$$

In these three equations and elsewhere in this document, where
$\Delta\phi_k^{GPS}$ is the single difference GPS carrier phase measurements, either L1 or L2;
$\Delta\rho^{GPS}$ is the theoretical single difference range (this can be calculated based on the estimated receiver locations);
$\Delta dT_{GPS}$ is the single difference GPS receiver clock;

$$\frac{\Delta I_k}{GPS f^2}$$

is the single difference ionospheric effect;
$\Delta d_k^{Drop}$ is the single difference tropospheric effect;
$\varepsilon_{\Delta\phi_k}$ is the carrier phase measurement noise;
$\Delta\phi_l^{GLN}$ is the single difference GLONASS carrier phase measurements, either G1 or G2;
$\Delta dT^{GLN}$ is the single difference GLONASS receiver clock;
$\Delta B_l^{GLN}$ is the single difference carrier phase inter-channel bias for GLONASS;
$\Delta T_{InterSystem}$ is the inter-system bias between GPS and GLONASS;
Subtracting (14) from (13), we get the following:

$$\Delta\phi_k^{GPS} - \Delta\phi_l^{GLN} = \Delta\rho^{GPS}/\lambda^{GPS} + c \cdot \Delta dT_{GPS}/\lambda^{GPS} + \qquad (16)$$
$$\Delta N_k^{GPS} - \frac{\Delta I_k}{GPS f^2}\Big/\lambda^{GPS} + \Delta d_k^{trop}/\lambda^{GPS} + \varepsilon_{\Delta\phi_k}^{GPS}/\lambda^{GPS} - $$
$$\left(\Delta\rho_l^{GLN}/\lambda_l^{GLN} + c \cdot \Delta dT^{GPS}/\lambda_l^{GLN} + c\frac{\Delta dT_{InterSystem}}{\lambda_l^{GLN}} + \Delta N_l^{GLN} - \right.$$
$$\left. \frac{\Delta I_k}{GLN f_l^2}\Big/\lambda_l^{GLN} + \Delta d_l^{trop}/\lambda_l^{GLN} + \Delta B_l^{GLN} + \varepsilon_{\Delta\phi_k}^{GLN}/\lambda_l^{GLN}\right)$$

The above equation can be re-organized as follows:

$$\Delta\phi_k^{GPS} - \Delta\phi_l^{GLN} = \qquad (17)$$
$$\Delta\rho^{GPS}/\lambda^{GPS} - \Delta\rho_l^{GLN}/\lambda_l^{GLN} + c \cdot \Delta dT_{GPS}\left(\frac{1}{\lambda^{GPS}} - \frac{1}{\lambda_l^{GLN}}\right) +$$
$$\Delta N_k^{GPS} - \left(\frac{\Delta I_k}{GPS f^2}\Big/\lambda - \frac{\Delta I_k}{GLN f_l^2}\Big/\lambda_l^{GLN}\right) +$$
$$(\Delta d_k^{trop}/\lambda^{GPS} - \Delta d_l^{trop}/\lambda_l^{GLN}) + \varepsilon_{\Delta\phi_k}^{GPS}/\lambda^{GPS} - $$
$$\varepsilon_{\Delta\phi_k}^{GLN}/\lambda_l^{GLN} - c\frac{\Delta dT_{InterSystem}}{\lambda_l^{GLN}} - \Delta N_l^{GLN} - \Delta B_l^{GLN}$$

As the GPS wavelength is very close to the GLONASS wavelength at the same frequency, the impact of the receiver clock bias contribution to inter-channel bias is significantly mitigated in the above equation. The system bias can be precisely determined by filtering the single difference code measurements. The residual ionospheric and tropospheric effects are assumed to be negligible after applying the empirical models and the residual estimates in the error-reduction filter (e.g., Kalman filter). The single difference GPS carrier phase ambiguity and GLONASS carrier phase ambiguity can be easily removed by rounding off the integer part in Equation (17). The GLONASS carrier phase inter-channel bias can be determined using the following equation:

$$\Delta B_l^{GLN} = \Delta\rho^{GPS}/\lambda^{GPS} - \Delta\rho_l^{GLN}/\lambda_l^{GLN} + c \cdot \Delta dT_{GPS}\left(\frac{1}{\lambda^{GPS}} - \frac{1}{\lambda_l^{GLN}}\right) + \qquad (18)$$
$$\Delta N_k^{GPS} - \left(\frac{\Delta I_k}{GPS f^2}\Big/\lambda^{GPS} - \frac{\Delta I_k}{GLN f_l^2}\Big/\lambda_l^{GLN}\right) +$$
$$(\Delta d_k^{trop}/\lambda^{GPS} - \Delta d_l^{trop}/\lambda_l^{GLN}) + \varepsilon_{\Delta\phi_k}^{GPS}/\lambda^{GPS} - $$
$$\varepsilon_{\Delta\phi_k}^{GLN}/\lambda_l^{GLN} - c\frac{\Delta dT_{InterSystem}}{\lambda_l^{GLN}} - \Delta N_l^{GLN} - (\Delta\phi_k^{GPS} - \Delta\phi_l^{GLN})$$

The carrier phase measurement noise can be mitigated by filtering the calculated phase bias. The real time calibration for GLONASS carrier phase biases is very similar to the procedure for GLONASS code biases. A low-pass filter is used for real-time carrier phase bias estimation. Similar to the GLONASS code bias processing, the carrier phase bias processing consists of 5 operations as with the same as code bias processing. The major difference is in the bias calibration. In this process, Equation 18 is used to calculate the residuals.

In step S620, a filter 70 (e.g., a low pass filter) filters the estimated inter-channel bias associated with the carrier phases to support real time carrier phase bias estimation.

The centimeter accuracy of GPS kinematic positioning can be theoretically achieved in real-time due to the millimeter resolution of the carrier phase observable with the unknown ambiguities recovered. In practice, however, reliable and correct ambiguity resolution depends on observations of a large number of satellites which constrains its applications, making it difficult to address positioning applications in areas where the number of visible satellites is limited. The method and system for estimating position with bias compensation is well suited for increasing the number of available satellites, by facilitating the combined observations from the GPS and GLONASS satellite constellations.

The method and system for estimating position with bias compensation is suitable for real-time GPS and GLONASS RTK applications. The foregoing method involves a GLONASS RTK algorithm and a multistep-step inter-channel bias calibration procedure for GLONASS code and carrier phase observations.

Having described the preferred embodiment, it will become apparent that various modifications can be made without departing from the scope of the invention as defined in the accompanying claims.

The following is claimed:

1. A method for estimating the position of an object or vehicle by a location-determining receiver associated with the object or vehicle, the method comprising:

measuring, by a primary phase measurement device of the receiver, a first carrier phase of each first carrier signal of a plurality of first carrier signals and a second carrier phase of each second carrier signal of a plurality of second carrier signals received by the location-determining receiver, each first carrier signal of the plurality of first carrier signals received at substantially the same frequency as others of the first carrier signals from two or more primary satellites, each second carrier signal of the plurality of second carrier signals received at substantially the same frequency as others of the second carrier signals from two or more primary satellites;

measuring, by a secondary phase measurement device of the receiver, a third carrier phase of each third carrier signal of a plurality of third carrier signals and a fourth carrier phase of each fourth carrier signal of a plurality of fourth carrier signals received by the location-determining receiver, each third carrier signal of the plurality of third carrier signals being transmitted at different frequencies from others of the plurality of third carrier signals from two or more secondary satellites, each fourth carrier signal of the plurality of fourth carrier signals being transmitted at different frequencies from others of the plurality of fourth carrier signals from two or more secondary satellites; each third carrier signal of the plurality of third carrier signals received at different frequencies from two or more secondary satellites and each fourth carrier signal of the plurality of fourth carrier signals received at different frequencies from two or more secondary satellites that results in an inter-channel bias between carrier signals from different ones of the secondary satellites observable at the location-determining receiver;

estimating a first integer ambiguity set associated with the measured first carrier phases, and a second integer ambiguity set associated with the measured second carrier phases;

estimating a third integer ambiguity set associated with the measured third carrier phases and a fourth integer ambiguity set associated with the measured fourth carrier phases;

establishing initial bias data for the inter-channel bias in accordance with a bias initialization procedure that operates in a first mode or a second mode, where in the first mode stored bias data is accessed or retrieved from a look-up table stored in a data storage device associated with the location-determining receiver to populate a real time kinematic engine, where in the second mode stored bias data provides coarse initial data comprising a pre-programmed default bias associated with corresponding hardware of the location-determining receiver;

after the bias initialization procedure, compensating for the inter-channel bias by estimating a compensation factor based on a double difference determination associated with the measured third carrier phase and the fourth carrier phase, where the compensation factor for inter-channel bias in the double difference ambiguity sets is estimated; and determining, by an estimator of the receiver, a position of the object or the vehicle based on the measured first carrier phases, the measured second carrier phases, the estimated first integer ambiguity set, the estimated second integer ambiguity set, and at least one of the measured third carrier phase and the measured fourth carrier phase, and at least one of the compensated third integer ambiguity set and the compensated fourth integer ambiguity set that are compensated for the inter-channel bias.

2. The method according to claim 1 further comprising:
determining single difference carrier phase measurements or determining single difference pseudo random noise code measurements associated with the secondary satellites to determine associated variances, the measurements assigned a corresponding time stamp or time indicator.

3. The method according to claim 1 wherein the compensating further comprises compensating for the inter-channel bias by estimating the compensation factor based on subtracting the inter-channel bias from a double difference code pre-fit residual associated with the double difference determination.

4. The method according to claim 3 wherein the double difference code pre-fit residual is determined in accordance with the following equation:

$$\lambda_j \Delta\phi_j - \lambda_k \Delta\phi_k = \nabla\Delta\rho_{k,j} + \lambda_j \cdot \Delta N_j - \lambda_k \cdot \Delta N_k + \nabla\Delta PB_{k,j} + \Delta I/f_j^2 - \Delta I/f_k^2 + \epsilon_{\nabla\Delta\phi_{k,j}},$$

where $\Delta\phi_j$ is a first single-differenced carrier phase observable expressed in units of cycles, $\Delta\phi_k$ is a second single-differenced carrier phase observable expressed in units of cycles; $\lambda_j$ and $f_j$ are the wavelength and frequency, respectively, of the carrier signal associated with the first single-differenced carrier phase observable; $\lambda_k$ and $f_k$ are the wavelength and frequency, respectively, of the carrier signal associated with the second single-differenced carrier phase observable; $\Delta N_j$ is the first single-differenced integer ambiguity associated with the first single-differenced carrier phase observable; $\Delta N_k$ is the second single-differenced integer ambiguity associated with the second single-differenced carrier phase observable; $\Delta I/f_j^2$ is the single-differenced ionospheric delay for the first single-differenced carrier phase observable, $\Delta I/f_k^2$ is the single-differenced ionospheric delay for the second single-differenced carrier phase observable, where I is a function of the Total Electron Content; and $\epsilon_{\Delta\phi_{kj}}$ is the carrier phase observation noise; $\Delta\rho_{k,j}$ is the single-differenced geometry distance; and $\Delta PB_{k,j}$ is the inter-channel bias for single-differenced (SD) carrier phase measurements.

5. The method according to claim 1 further comprising:
calibrating the estimation of the inter-channel bias in accordance with a single differenced calibration to allow for changes in the satellites received or available to the location determining receiver by converting the double difference post fit residuals into single difference residuals.

6. The method according to claim 1 further comprising:
assigning time indicators or time stamps for corresponding single difference carrier phase measurements or pseudo random noise code measurements associated with the secondary satellites and for associated variances, and
after processing all epoch data as verified by the time stamps, calibrating the estimation for the inter-channel bias in accordance with a single differenced calibration to allow for changes in the satellites received or available to the location determining receiver by converting the double difference post fit residuals into single difference residuals.

7. The method according to claim 1 further comprising:
monitoring a quality level of the compensation factor, the quality level based on whether there is a significant jump or abrupt change in the magnitude of the compensation factor over a sample time period.

8. The method according to claim 7 further comprising:
monitoring the quality level of the compensation factor, the quality level based on an occurrence of the significant jump and whether a RAIM algorithm flags a single difference code solution or a single difference carrier phase solution as unreliable.

9. The method according to claim 7 further comprising:
resetting bias information for a particular satellite for storing in a look-up table or use by a real time kinematic engine to estimate solutions to ambiguities.

10. The method according to claim 1 further comprising:
calibrating the estimation of the inter-channel bias associated with carrier phases of the secondary satellites in accordance with a single differenced calibration to allow for changes in the satellites received or available to the location determining receiver by determining residuals in accordance with the following equation:

$$\Delta B_l^{GLN} = \Delta \rho^{GPS}/\lambda^{GPS} - \Delta \rho_l^{GLN}/\lambda_l^{GLN} + c \cdot \Delta dT_{GPS}\left(\frac{1}{\lambda^{GPS}} - \frac{1}{\lambda_l^{GLN}}\right) +$$

$$\Delta N_k^{GPS} - \left(\frac{\Delta I_k}{GPS f^2}/\lambda^{GPS} - \frac{\Delta I_k}{GLN f_l^2}/\lambda_l^{GLN}\right) +$$

$$(\Delta d_k^{trop}/\lambda^{GPS} - \Delta d_l^{trop}/\lambda_l^{GLN}) + \varepsilon_{\Delta \phi_k}^{GPS}/\lambda^{GPS} -$$

$$\varepsilon_{\Delta \phi_k}^{GLN}/\lambda_l^{GLN} - c\frac{\Delta dT_{InterSystem}}{\lambda_l^{GLN}} - \Delta N_l^{GLN} - (\Delta \phi_k^{GPS} - \Delta \phi_l^{GLN})$$

where
$\Delta \phi_k^{GPS}$ is the single difference GPS carrier phase measurements, either L1 or L2;
$\Delta \rho^{GPS}$ is the theoretical single difference range;
$\Delta dT_{GPS}$ is the single difference GPS receiver clock;

$$\frac{\Delta I_k}{GPS f^2}$$

is the single difference ionospheric effect;
$\Delta d_k^{trop}$ is the single difference tropospheric effect;
$\varepsilon_{\Delta \phi_k}$ is the carrier phase measurement noise;
$\Delta \phi_l^{GLN}$ is the single difference GLONASS carrier phase measurements, either G1 or G2;
$\Delta dT^{GLN}$ is the single difference GLONASS receiver clock;
$\Delta B_l^{GLN}$ is the single difference carrier phase inter-channel bias for GLONASS; and $\Delta dT_{InterSystem}$ is the inter-system bias between GPS and GLONASS.

11. The method according to claim 10 further comprising:
filtering the estimated inter-channel bias associated with the carrier phases with a low pass filter to support real time carrier phase bias estimation.

12. A method for estimating the position of an object or vehicle by a location-determining receiver associated with the object or vehicle, the method comprising:
measuring, by a primary phase measurement device of the receiver, a first carrier phase of each first carrier signal of a plurality of first carrier signals and a second carrier phase of each second carrier signal of a plurality of second carrier signals received by the location-determining receiver, each first carrier signal of the plurality of first carrier signals received at substantially the same frequency as others of the first carrier signals from two or more primary satellites, each second carrier signal of the plurality of second carrier signals received at substantially the same frequency as others of the second carrier signals from two or more primary satellites;
measuring, by a secondary phase measurement device of the receiver, a third carrier phase of each third carrier signal of a plurality of third carrier signals and a fourth carrier phase of each fourth carrier signal of a plurality of fourth carrier signals received by the location-determining receiver, each third carrier signal of the plurality of third carrier signals being transmitted at different frequencies from others of the plurality of third carrier signals from two or more secondary satellites, each fourth carrier signal of the plurality of fourth carrier signals being transmitted at different frequencies from others of the plurality of fourth carrier signals from two or more secondary satellites; each third carrier signal of the plurality of third carrier signals received at different frequencies from two or more secondary satellites and each fourth carrier signal of the plurality of fourth carrier signals received at different frequencies from two or more secondary satellites that results in an inter-channel bias between carrier signals from different ones of the secondary satellites observable at the location-determining receiver;
estimating a first integer ambiguity set associated with the measured first carrier phases, and a second integer ambiguity set associated with the measured second carrier phases;
estimating a third integer ambiguity set associated with the measured third carrier phases and a fourth integer ambiguity set associated with the measured fourth carrier phases;
establishing initial bias data for the inter-channel bias in accordance with a bias initialization procedure that operates in a first mode or a second mode, where in the first mode stored bias data is accessed or retrieved from a look-up table stored in a data storage device associated with the location-determining receiver to populate a real time kinematic engine, where in the second mode stored bias data provides coarse initial data comprising a pre-programmed default bias associated with corresponding hardware of the location-determining receiver;
after the bias initialization procedure, compensating for the inter-channel bias by estimating a compensation factor based on a double difference determination or single difference residuals associated with the measured third carrier phase and the fourth carrier phase; and determining, by an estimator of the receiver, a position of the object or the vehicle based on the measured first carrier phases, the measured second carrier phases, the estimated first integer ambiguity set, the estimated second integer ambiguity set, and at least one of the measured third carrier phases and the measured fourth carrier phases, and at least one of the compensated third integer ambiguity set and the compensated fourth integer ambiguity set that are compensated for the inter-channel bias; and calibrating the estimation of the inter-channel bias associated with carrier phases of the secondary satellites in accordance with a single differenced calibration to allow for changes in the satellites received or available to the location determining receiver by determining the residuals in accordance with the following equation:

$$\Delta B_l^{GLN} = \Delta \rho^{GPS}/\lambda^{GPS} - \Delta \rho_l^{GLN}/\lambda_l^{GLN} + c \cdot \Delta dT_{GPS}\left(\frac{1}{\lambda^{GPS}} - \frac{1}{\lambda_l^{GLN}}\right) +$$
$$\Delta N_k^{GPS} - \left(\frac{\Delta I_k}{GPS\,f^2}/\lambda^{GPS} - \frac{\Delta I_k}{GLN\,f_l^2}/\lambda_l^{GLN}\right) +$$
$$(\Delta d_k^{trop}/\lambda^{GPS} - \Delta d_l^{trop}/\lambda_l^{GLN}) + \varepsilon_{\Delta\phi_k}^{GPS}/\lambda^{GPS} -$$
$$\varepsilon_{\Delta\phi_k}^{GLN}/\lambda_l^{GLN} - c\frac{\Delta dT_{InterSystem}}{\lambda_l^{GLN}} - \Delta N_l^{GLN} - (\Delta\phi_k^{GPS} - \Delta\phi_l^{GLN})$$

where $\Delta\phi_k^{GPS}$ is the single difference GPS carrier phase measurements, either L1 or L2;

$\Delta\rho^{GPS}$ is the theoretical single difference range;

$\Delta dT_{GPS}$ is the single difference GPS receiver clock;

$$\frac{\Delta I_k}{GPS\,f^2}$$

is the single difference ionospheric effect;

$\Delta d_k^{trop}$ is the single difference tropospheric effect;

$\epsilon_{\Delta\phi_k}$ is the carrier phase measurement noise;

$\Delta\phi_l^{GLN}$ is the single difference GLONASS carrier phase measurements, either G1 or G2;

$\Delta dT^{GLN}$ is the single difference GLONASS receiver clock;

$\Delta B_l^{GLN}$ is the single difference carrier phase inter-channel bias for GLONASS; and $\Delta dT_{InterSystem}$ is the inter-system bias between GPS and GLONASS.

13. The method according to claim 12 further comprising:

filtering the estimated inter-channel bias associated with the carrier phases with a low pass filter to support real time carrier phase bias estimation.

* * * * *